United States Patent [19]

Lennington

[11] 4,325,146
[45] Apr. 13, 1982

[54] NON-SYNCHRONOUS OBJECT IDENTIFICATION SYSTEM

[76] Inventor: John W. Lennington, 2491 Oakdale Dr., Ann Arbor, Mich. 48104

[21] Appl. No.: 105,651

[22] Filed: Dec. 20, 1979

[51] Int. Cl.³ .............................................. H04B 9/00
[52] U.S. Cl. .................................. 455/604; 340/636; 340/825.54; 370/92; 455/608
[58] Field of Search .............................. 455/604, 608; 340/152 T, 636; 370/92

[56] References Cited

U.S. PATENT DOCUMENTS

| | | | |
|---|---|---|---|
| 3,377,616 | 4/1968 | Auer | 455/604 |
| 3,633,158 | 1/1972 | Heibel | 455/604 |
| 3,937,880 | 2/1976 | Schlenker | 340/152 T |
| 4,010,456 | 3/1977 | Erni | 340/636 |
| 4,025,791 | 5/1977 | Lennington | 250/341 |
| 4,099,050 | 7/1978 | Sauermann | 455/604 |
| 4,121,102 | 10/1978 | Wilson | 250/341 |
| 4,131,791 | 12/1978 | Lego | 455/604 |
| 4,134,008 | 1/1979 | de Corlieu | 455/604 |
| 4,213,119 | 7/1980 | Ward | 455/608 |

*Primary Examiner*—Howard Britton
*Attorney, Agent, or Firm*—Harness, Dickey & Pierce

[57] ABSTRACT

A transponder/interrogator system for remotely identifying objects. The interrogator emits optical pulses to activate the transponder. Upon such activation, the transponder emits a unique code in the form of optical pulses in accordance with a program stored in its memory. The interrogator receives the optical pulses from the transponder and decodes them. The decoded information is then supplied to peripheral equipment which run various status checks on the object identified and takes appropriate action.

10 Claims, 22 Drawing Figures

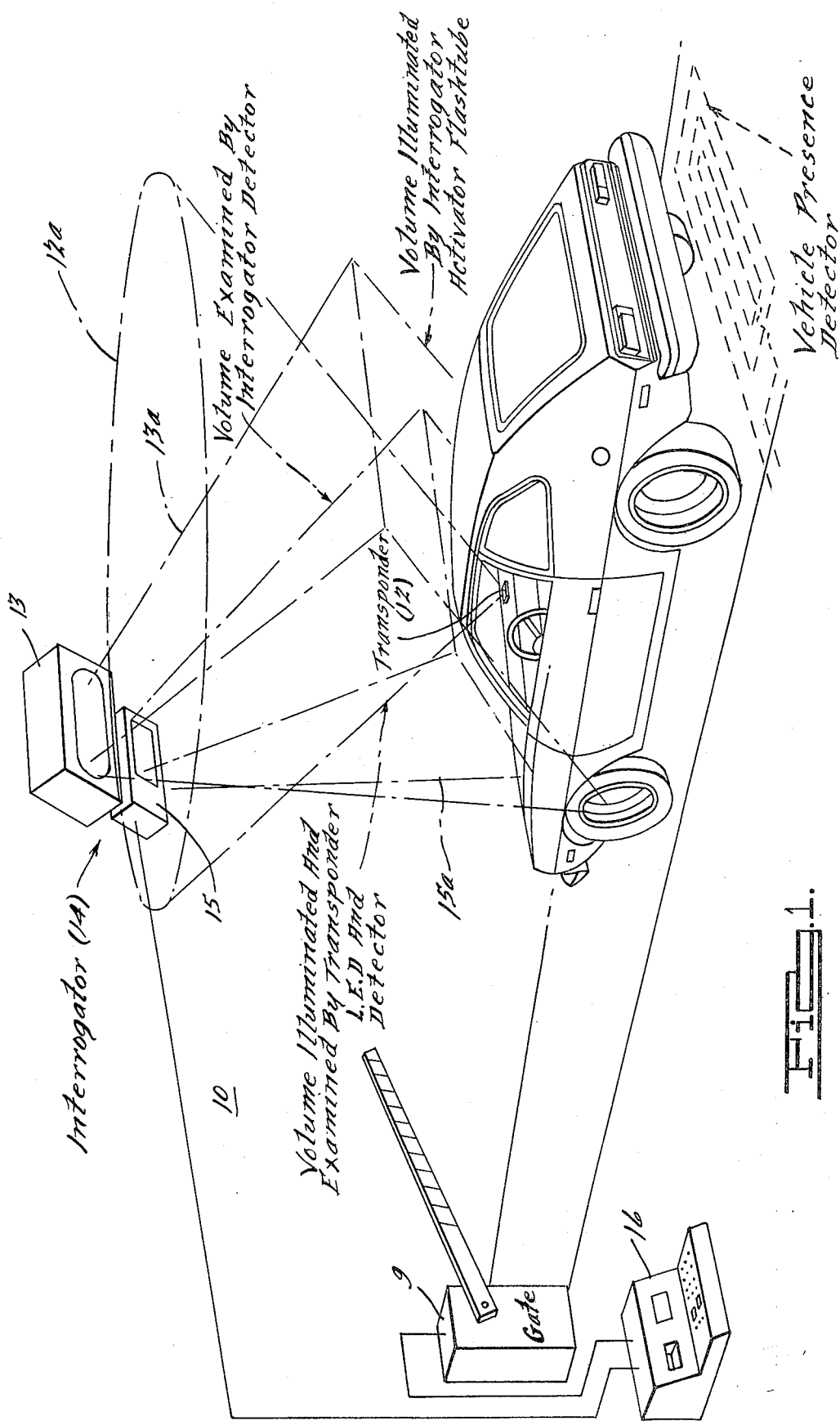

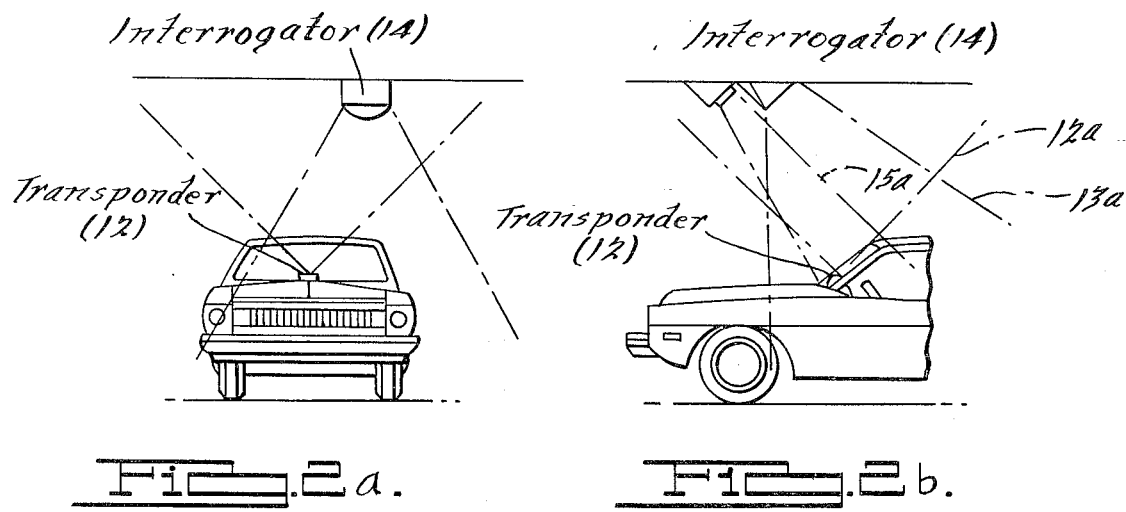
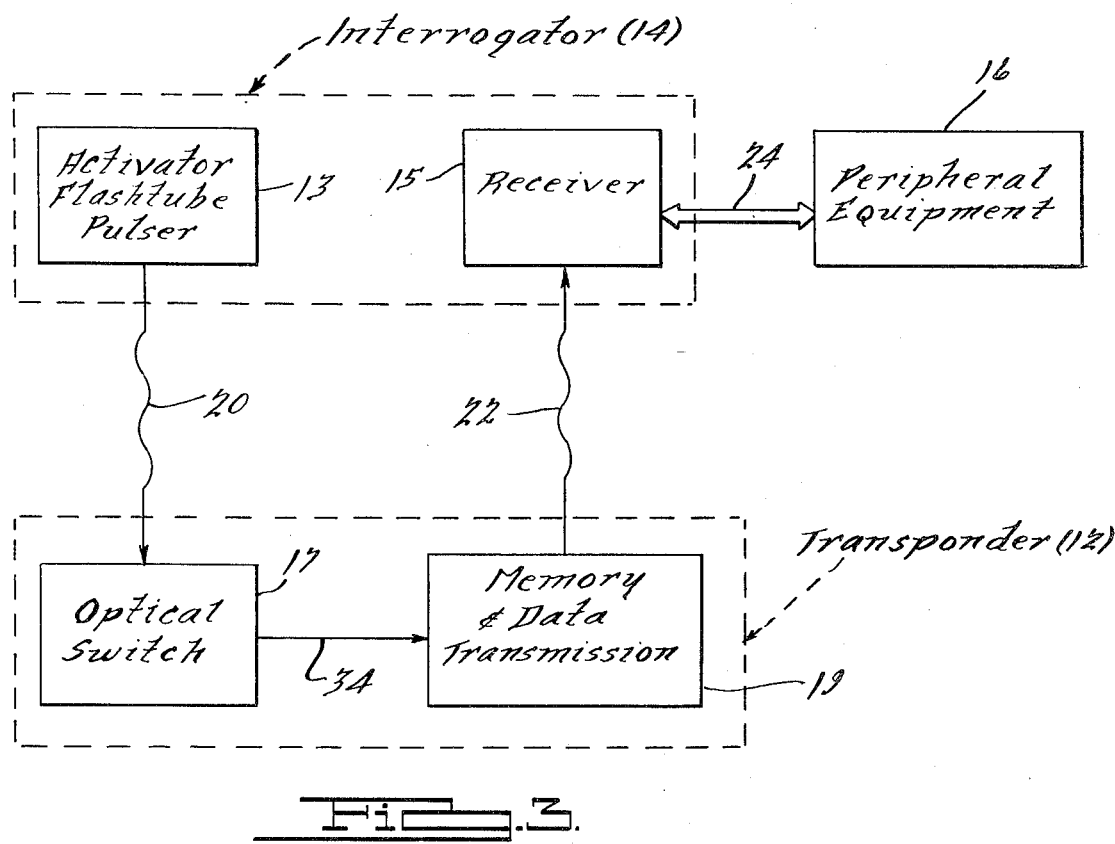

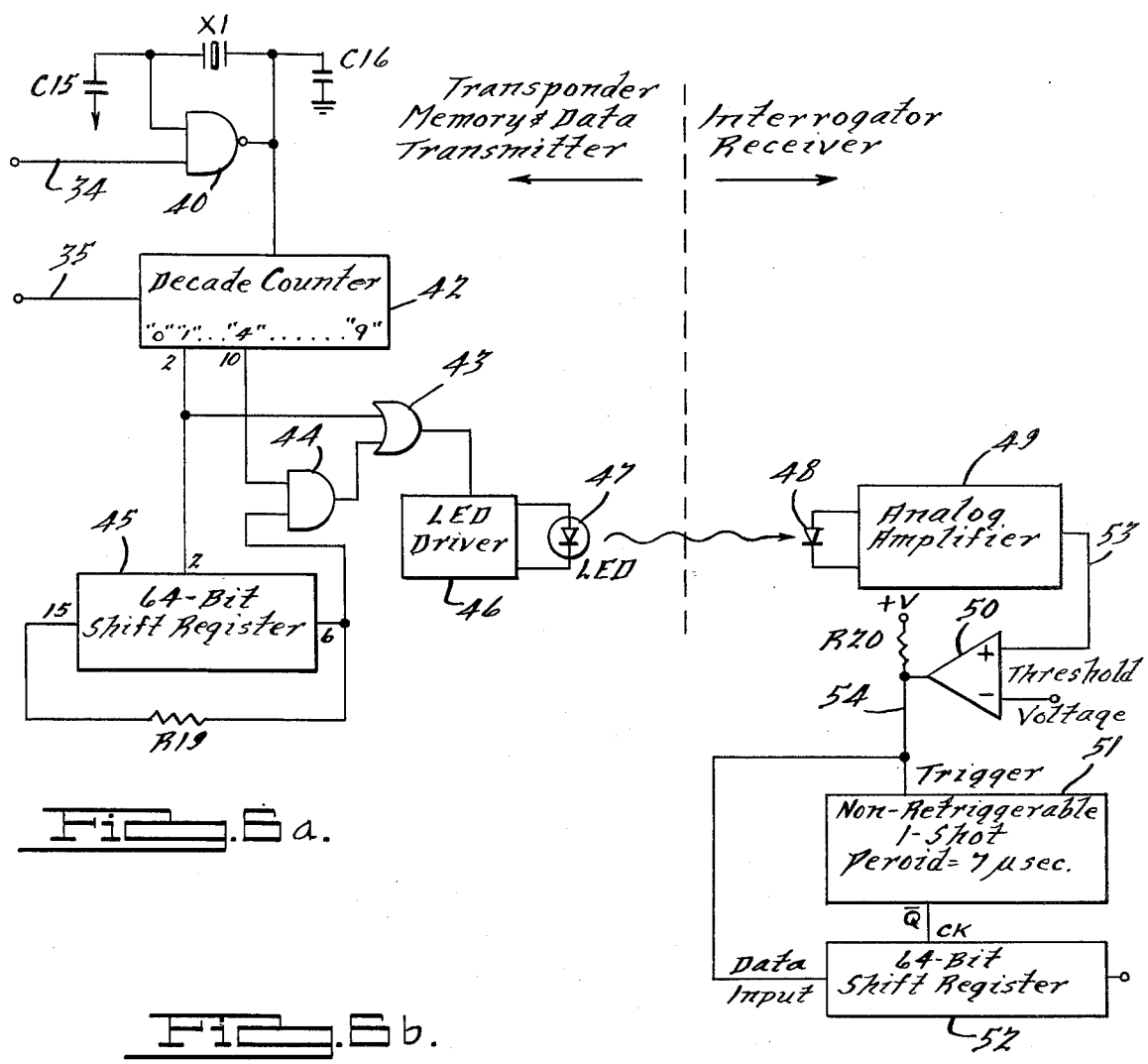
Fig. 6a.
Fig. 6b.
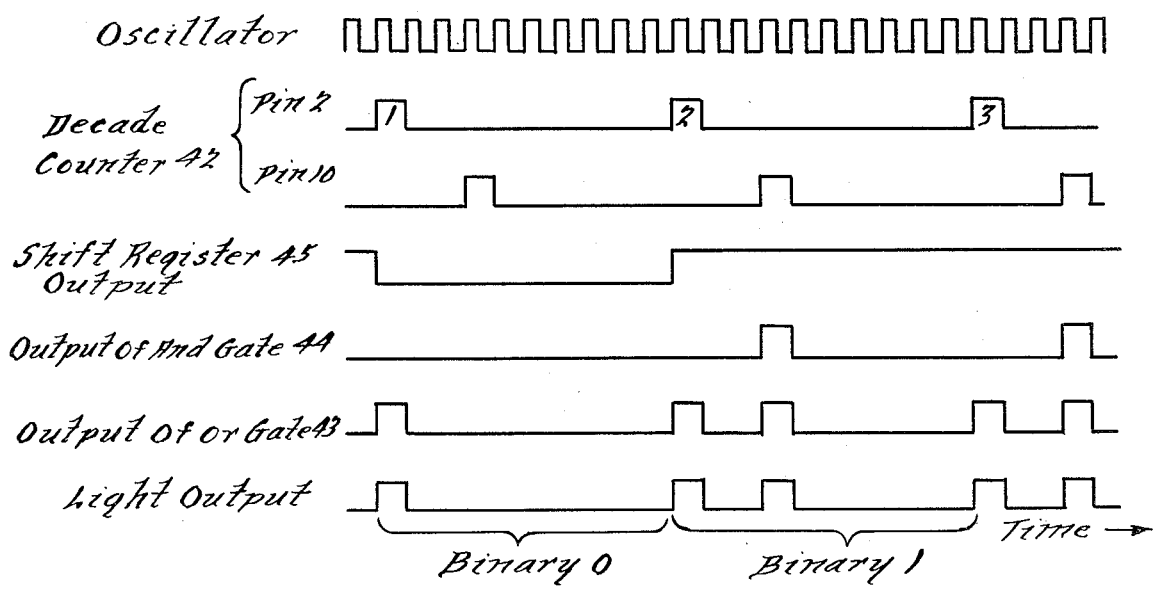

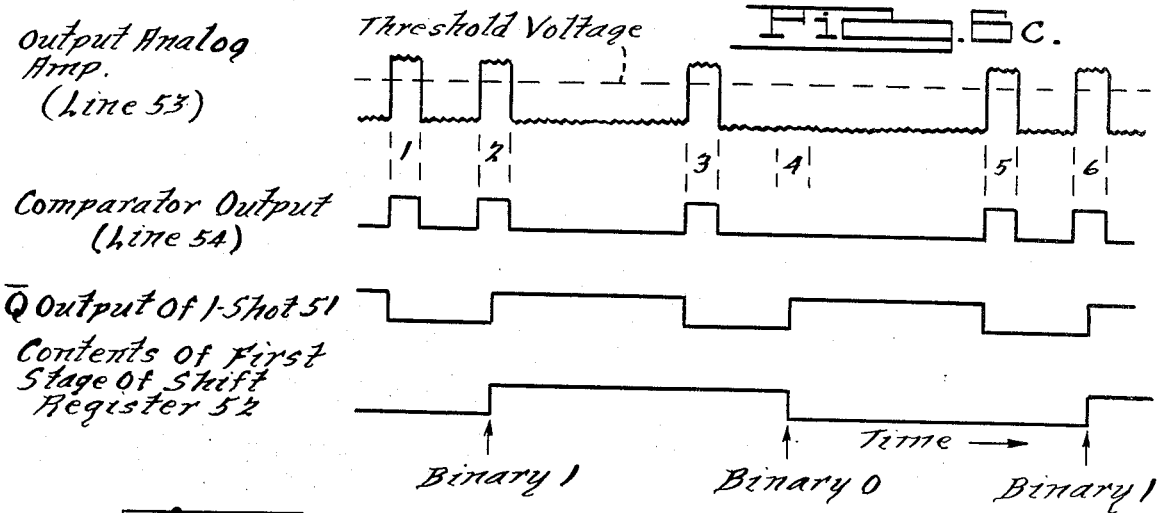
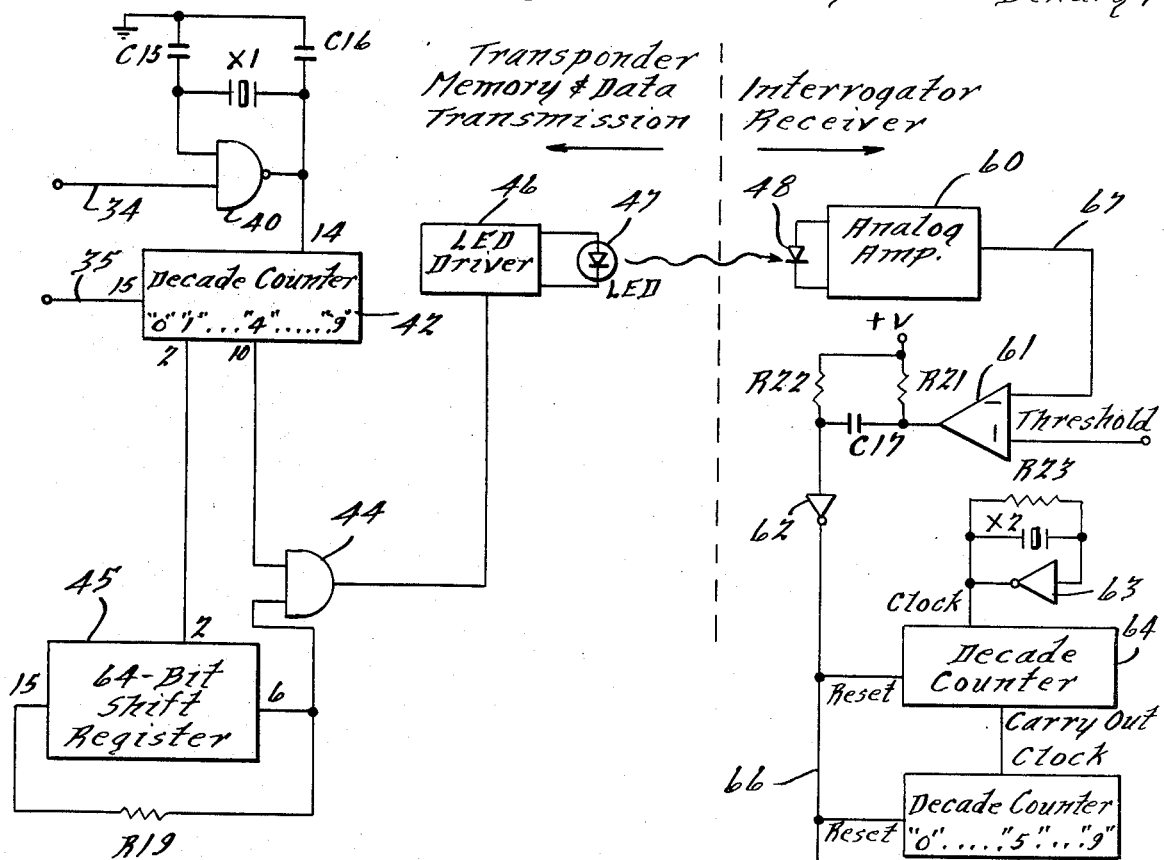
FIG. 7a.

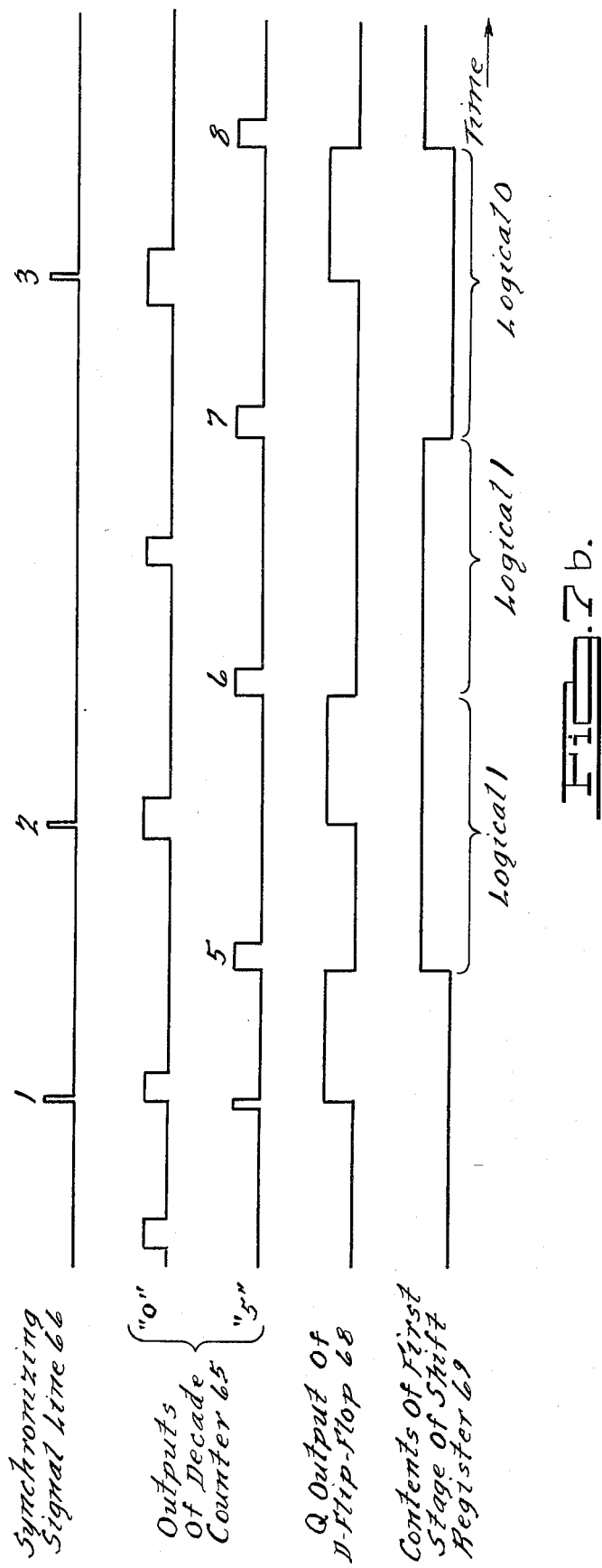

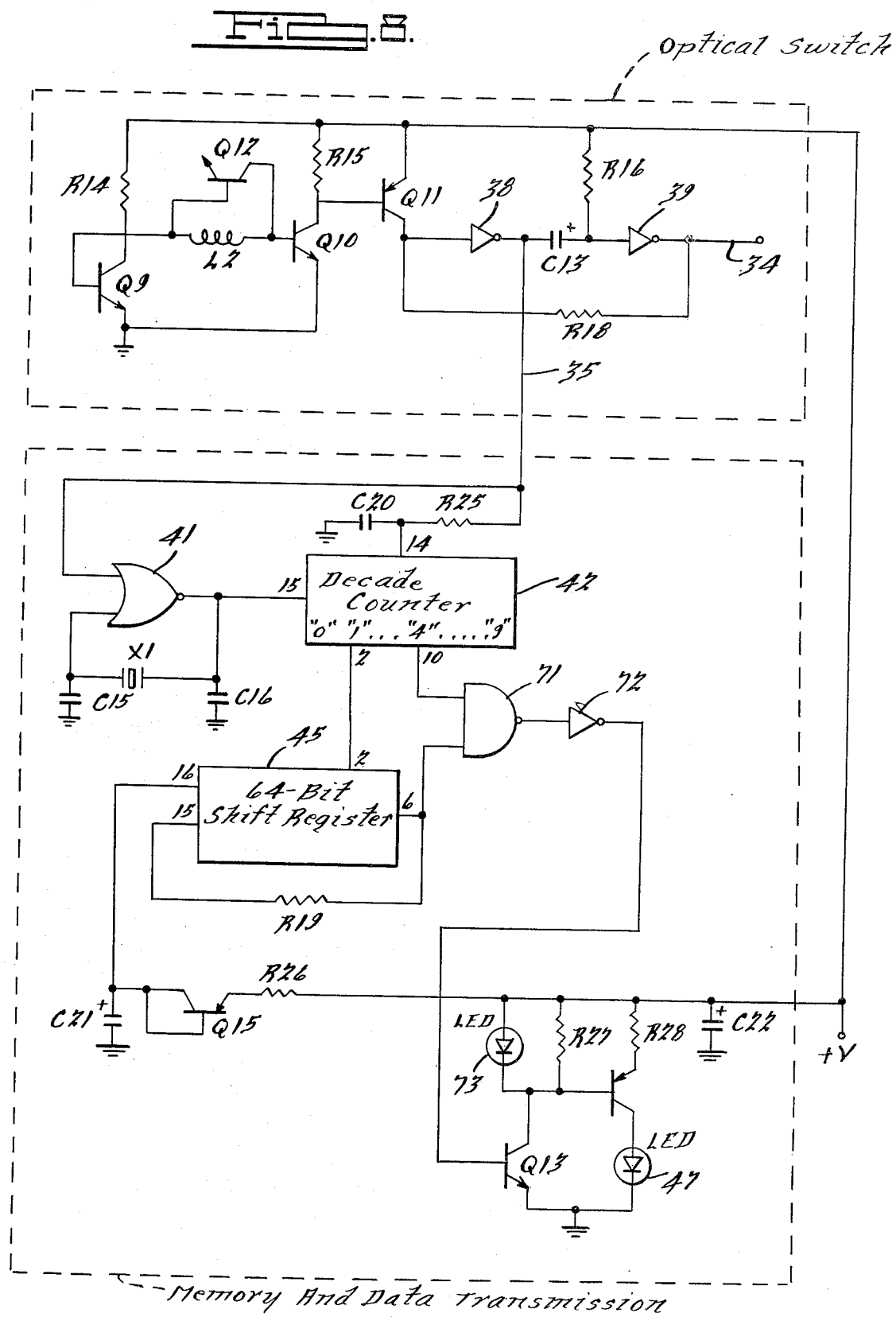

NON-SYNCHRONOUS OBJECT IDENTIFICATION SYSTEM

BACKGROUND AND SUMMARY OF THE INVENTION

The present invention relates to a system for remotely identifying an object such as that disclosed and claimed in the application of Stanley R. Sternberg and John W. Lennington entitled "Remote Identification System", Ser. No. 603,927, filed Aug. 12, 1975, now issued as U.S. Pat. No. 4,025,791 as well as in the application of Stephen S. Wilson entitled "Object Identification System", Ser. No. 709,237, filed July 27, 1976, now issued as U.S. Pat. No. 4,121,102. The remote identifying system of this invention is adapted to identify any object which may carry a transponder of the type disclosed herein in a position so that the transponder is in optical communication with an interrogator. One particularly useful application of the remote identifying system of this invention is to identify automobiles as they enter and depart a parking structure or the like so that their entry and departure may be recorded and their identification checked against a compilation of authorized vehicles. Advantageously, the system of the present invention eliminates the necessity of stopping the vehicle to obtain a ticket or use another authorizing device such as a machine readable card. Another pertinent application involves the use of system on toll roads, where the system could eliminate toll booths and provide an automatic billing system while eliminating the traffic obstruction of the toll booths.

In the past, many systems have been suggested for remotely identifying objects. Generally, the systems can be classified into two general classes, (1) passive device systems, and (2) active device systems. The passive device systems may use labels or other structures on the object which may be read or which may cooperatively function with an interrogator to yield an identifying code. Generally, devices for reading labels such as pattern recognition systems are costly and complex, and as a result, do not lend themselves to many applications in which object identification without human assistance would be desirable. Passive device readers such as those using structures which are selectively resonant with ultrasonic vibrations or high frequency electromagnetic waves have the disadvantages of requiring an inventory of a large number of unique passive structures and very precise manufacture of the passive structures. There are further limitations relative to the number of unique codes which can be stored or transferred economically in the available time.

Active device object identification systems may be classified in the following categories: (1) high frequency or radio frequency electromagnetic communicators, (2) light beam communicators, and (3) electromagnetic field communicators. The radio frequency devices have the disadvantages of requiring compliance with Federal Communications Systems' rules and the further disadvantage of susceptibility to radio frequency interference. This susceptibility requires the use of highly directional receiving and transmitting antennae. The magnetic field devices are difficult to implement due to the shielding of the steel bodies of automobiles and the existence of strong time-varying, interfering magnetic fields from generators and other devices which are associated with the automobile.

The object identification system of the present invention avoids many of the difficulties of the prior art identification systems through the use of unique optical and electronic structures and methods. The transponder of the object identification system of this invention can operate on its self-contained power source for a period well in excess of one year without replenishment, requires no attention from the carrier of the transponder to emit its identifying code, is physically small, e.g., approximately the size of a cigarette pack, so that it may be carried by a large variety of small objects, and is capable of transmitting information rapidly enough so that, for example, a 64-bit binary number can be received several times by an interrogator at a fixed location as the object passes the location of the interrogator at speeds in excess of 60 miles per hour, thusly providing redundant interrogation even at high transit speed.

As previously indicated, the remote identifying system of this invention is especially useful as a means for identifying vehicles as they enter or exit a parking facility or as they pass under interrogators on toll roads. Presently, a number of different methods are in commercial use for identifying vehicles as they enter a parking facility. One such system is to provide each authorized vehicle with a sticker or other label which may be viewed by an attendant at the entrance of the parking facility. This method for identifying vehicles has the advantage that the driver is not required to stop the vehicle as it enters the parking facility but has the decided disadvantage of requiring the employ and constant attention of a parking attendant. The system is subject to human error and attendant inattention or dishonesty so that unauthorized vehicles or vehicles with expired leases may be allowed to enter. Another commercial system employs magnetic cards which the driver is required to insert into a slot in a card receptor at the entrance to the parking facility. The driver must stop his vehicle, thereby slowing the rate of entry of vehicles into the parking facility and inconveniencing the driver. The slow entry rate complicates the provision for traffic at the entry to the parking facility and often necessitates additional parking facility entrances to accommodate the slow entry rate. Accordingly, the cost of the parking facility is increased.

The use of such a system on toll roads is just now being seriously considered, and various systems for this application are now under test. Basically, the system must remotely identify vehicles passing through traffic lanes at highway speeds. The number storage capacity of the transponder must be very high (greater than 1 billion numbers) and the battery life in the transponder must be longer than one year. The transponder must obviously respond and transmit its data very quickly.

The object identifying system of the present invention, when used to identify vehicles entering a parking facility, has the substantial advantage of providing rapid and accurate identification of vehicles without requiring the employ of an attendant at each entrance or the stopping of each vehicle at the entrance. Accordingly, the vehicle may enter the parking facility at any practical speed. Furthermore, this system provides a high degree of user convenience. In addition, the digital code used by the system of this invention permits automatic parking control, computer accounting, billing, audit and vehicle inventory. For example, in the preferred embodiment, the digital code representing the vehicle entering the parking structure is provided to a controller for automatic comparison to a compilation in the memory thereof of authorized vehicles, time recording, and vehicle entry and departure recording so as to provide accurate and highly reliable control of the access of the parking facility vehicle inventory and accounting.

In its preferred form, the object identifying system according to the present invention includes a transponder which is carried by the object to be identified and an interrogator which may be in a fixed position and is in optical communication with the transponder. Preferably, the transponder and the interrogator are capable of detecting and emitting light pulses, e.g. pulses in the infrared band. The transponder is provided with a memory which stores a digital code which uniquely identifies the object carrying the transponder. In the preferred embodiment, the memory of the transponder is a recirculating shift register which is programmed with the digital code. With minor modification of the transponder circuitry, a random-access memory could be used as the storage medium.

While the present invention shares some common features with the systems disclosed in the listed patents, the principal distinction between these prior art systems and the present invention is that the system of the present invention uses nonsynchronous communication between transponder and interrogator rather than synchronous communication. In synchronous systems, the transponders transmit their data bits in synchronism with light pulses received from the interrogator. In other words, the interrogator receives or interprets a single bit of information from the transponder in response to each light pulse which is transmitted by the interrogator. Also, the time between the interrogator emitted pulse and the received or implied data pulse is relatively well-known. In a non-synchronous system, the interrogator light pulse which is repeated at a rate of 60–120 pulses per second is merely used to activate the transponder and shift it from the quiescent state into the transmitting state, and no special temporal relation exists between interrogator light pulses and transmitted data bits. In other words, the light pulse from the interrogator simply serves to turn on an optically-activated switch within the transponder which then remains in the active (or transmitting) state for a predetermined time which is deemed to be sufficient for the transponder to accurately transmit its identifying code to the interrogator. This switch will respond to any single light pulse emitted by the interrogator.

Note that in applications where a manually-activated transponder could be used, the optically-activated switch in the transponder can be replaced directly with a manual switch. Such a direct adaptation of the transponder in a synchronous system is not possible.

The development of the non-synchronous system of the present invention was accomplished in response to user requirements which are not adequately served by a synchronous system. Primary among these are system cost and performance. The following is a comparative listing of some important performance/cost characteristics for the synchronous and the non-synchronous systems.

1. Interrogator transmitter
(a) Synchronous system
Banks of expensive high-powered LED's or equivalent light sources are required to produce CW light pulses from the interrogator which can be detected by the transponder. The LED's and their associated driver circuits generate a great deal of heat, which must be dissipated by large and expensive heat sinks. No adequate replacement has been found for the LED's as a CW light source.

(b) Non-synchronous system
The preferred light source is a xenon flashtube, which generates light pulses of less than 10 usec. duration at a repetition rate of 60–120 pulses per second. The flashtube and driver circuitry have a substantial cost advantage over that associated with the LED's and drivers. The power input to the flashtube is only about 35 watts, most of which is converted to light output so there is negligible heat generated by the flashtube and its circuitry.

2. Transponder receiver
(a) Synchronous system
The transponder receiver must contain high-gain, linear, high slew rate, tuned amplifiers to receive the light pulses from the interrogator and reject unwanted signals. These amplifiers are expensive, contain many parts, and are somewhat tempermental. Also, they consume considerable quiescent current from the transponder battery.

(b) Non-synchronous system
The transponder receiver is composed entirely of switching circuitry and, as such, its design is much less critical than the design of linear tuned circuitry. Also, since the non-synchronous transponder utilizes swithing circuitry which only has to turn on rapidly (it can turn off relatively slowly), the switching devices can be in, or nearly in, the off state when not activated. Thus, if the receiver circuit is properly designed, the battery current consumption of the nonsynchronous transponder receiver can be less than one-tenth that of its synchronous counterpart.

3. Data transmission rate of transponder
(a) Synchronous system
The rate at which data can be transmitted is tied directly to the rate at which pulses can be received and accurately resolved. Since amplifier bandwidth is a direct function of amplifier current consumption, the data rate is ultimately a function of current consumption. At acceptable current consumption levels, the synchronous transponder data rate has been limited to less than 7000 bits/second. Also, since the amplifiers are tuned, the receiver has a rather long transient response which is manifested as a delay of several milliseconds between the time when light pulses impinge upon the transponder and the time when the transponder begins to emit data.

(b) Non-synchronous system
Since the transponder transmitting capability is dependent upon the receiver section only to the extent that it must be turned on by the receiver section, it can transmit data at a rate in excess of 100,000 bits/second. A data rate of 50,000 bits/second was arbitrarily chosen for the preferred embodiment described herein, and could easily be increased if desired.

4. Usable transponder number capacity
(a) Synchronous system
The usable number of distinct numbers which can be stored in a transponder depends upon the optical configuration of the interrogator receiver and transmitter, the data rate of the transponder, the speed at which the transponder moves and the level of data redundancy which is required to maintain an acceptably low error rate. Systems using all of the variables above to best advantage have a usable transponder number capacity of 8000 numbers for a maximum expected transponder speed of 30 miles per hour, and considerably less than that for a maximum transponder speed of 60 miles per hour.

This number capacity, while adequate for parking garage use, is totally inadequate for toll road use.

(b) Non-synchronous system

The non-synchronous transponder uses a 30-bit binary code which provides over one billion distinct numbers. The system of this invention in its preferred form can reliably read one of these numbers from a transponder moving in excess of 120 miles per hour. This level of performance can be further improved through modification of the interrogator optical activation mechanism.

5. Transponder—interrogator optical interference (a) Synchronous system

Since all high-power LED's emit at roughly the same wavelength and since the synchronous system uses these LED's for communication in both directions at a synchronized pulse rate, there is a problem with interference between the two signals.

(b) Non-synchronous system

Since the flashtube pulses only at a rate of somewhere between 60 and 120 pulses per second and since the width of these pulses is only a few microseconds, interference occurs only briefly and relatively infrequently. In actual operations, interferences prove to be irrelevant to proper system operation.

6. System cost

It is estimated that at current prices a non-synchronous system fulfilling a given overall system requirement can be built for less than one-half of the cost of a synchronous system which fulfills the same requirement.

BRIEF DESCRIPTION OF THE DRAWINGS

FIG. 1 is a view of an exemplary application of the object identification system according to the present invention as a vehicle identification system for a parking facility;

FIGS. 2a and 2b are further views of the transponder, as it is positioned on the upper surface of a dashboard by a vehicle, and the interrogator shown in FIG. 1;

FIG. 3 is a block diagram of the object identification system according to the present invention;

FIG. 6a is a schematic diagram of one alternative embodiment of the data communication link between the transponder and interrogator receiver;

FIGS. 6b and 6c are timing diagrams associated with the circuitry shown in FIG. 6a.

FIG. 7a is a schematic diagram of another alternative embodiment of the data communication link between the transponder and interrogator receiver;

FIG. 7b is a timing diagram associated with the circuitry shown in FIG. 7a;

FIG. 8 is a circuit diagram of one embodiment of the transponder;

DETAILED DESCRIPTION OF THE PREFERRED EMBODIMENTS

Figure 4A:
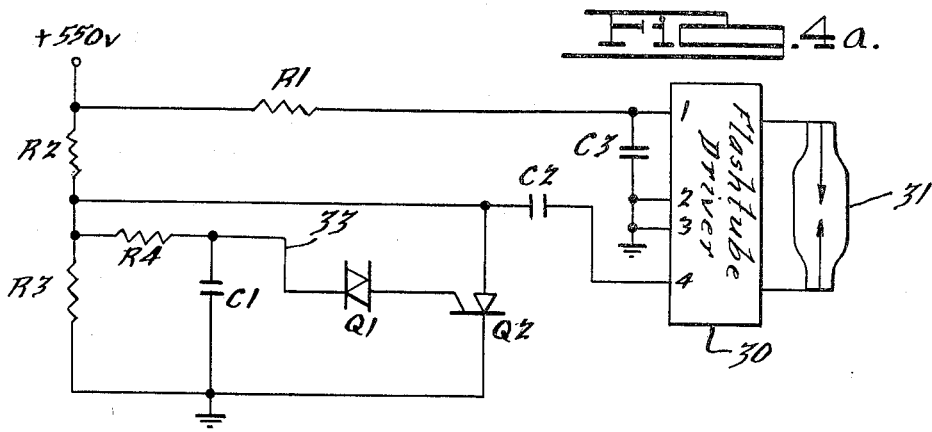
FIGS. 4a, 4b, 4c and 4d illustrate the activator flashtube circuitry and the details of the preferred xenon flashtube assembly used to remotely activate the transponders.

Referring to FIG. 1, the object identification system 10 of this invention is illustrated in an exemplary application for identifying vehicles entering a parking facility. The system 10 includes a transponder 12 which is preferably located on the dashboard or windshield of the vehicle and an interrogator 14 which is generally located in a fixed position above the entry lane of the parking facility. Note that the interrogator is illustrated as a single unit comprising the optical activator section and the receiver section, although these two portions need not exist as a single unit. They are completely separable, and in some applications it would be desirable to separate them. The transponder 12 and the interrogator 14 are generally in mutual communication. The system 10 would generally include peripheral equipment denoted as 16, which might include data readouts, a computer for determining admission through the lane and for bookkeeping, one or more gate-control units, a transponder programmer, etc. The interrogator may be operated on a continuous basis so as to detect and identify any transponder 12 within the interrogator receiver's field-of-view or may be activated using any conventional vehicle presence detector as illustrated at 11. Note that the optical field-of-view of the interrogator receiver 15 indicated by the interrupted lines designated 15a showing a trapezoidal volume is essentially contained within the optical field of the optical activator 13, indicated by the interrupted lines designated 13a showing a second, larger trapezoidal volume. Note also that the interrogator 14 has a field of reception which is included within the field of reception/transmission of the transponder 12, the latter's field of reception/transmission being shown by interrupted lines designated 12a as a conical volume. When the interrogator 14 mutually communicates with an authorized transponder 12, the gate 9 to the parking facility is opened under control of the peripheral equipment 16.

In FIGS. 2a and 2b, the relative positions of the transponder 12 relative to the interrogator 14 is illustrated in frontal and side views of the vehicle. In those figures, the overlapping nature of the fields of transmission/reception of the transponder 12 and interrogator 14 can be readily seen.

In FIG. 3, a block diagram of the object identification system 10 according to the present invention is illustrated. In FIG. 3, the system 10 includes the transponder 12, the interrogator 14, and the peripheral equipment 16 shown in FIG. 1. Further, the interrogator 14 comprises the activator flashtube pulser 13 and the receiver 15. The transponder comprises the optical switch 17 and the memory and data transmission section 19. The transponder 12 is normally in a receive-only mode and is activated to its transmit mode upon the receipt of a light pulse, shown illustratively at 20. The transponder 12 is adapted to sequentially emit a coded set of pulses, for example, a repeated binary word comprising 64 bits, along the light path shown illustratively at 22. The interrogator 14 regularly provides activating light pulses shown illustratively at 20 and receives transponder pulses 22 when a transponder is within the field-of-view of the receiver of interrogator 14. The interrogator provides digital signals on buss 24 to the peripheral equipment 16, which may contain several independent lines carrying, respectively, serial digital data representative of the code transmitted by the transponder, the clock signal associated with the serial data, and a sync signal indicating the start of the code in the serial data. The serial data alone is sufficient for the peripheral equipment to correctly obtain the data, but the additional signals may make subsequent signal processing more convenient or efficient. The peripheral equipment 16 then takes whatever actions are indicated by the particular application in response to the data received on buss 24.

Preferably, the interrogator activator 13 is provided with a suitable optical dispersal system so that the activating light pulses transmitted by the interrogator 14 will be confined to a perdetermined area through which objects carrying the transponder 12 will pass. In the example of FIG. 1, this area is the entry lane of a parking facility preceding the entry gate 9 which is operable to admit the vehicle into the parking structure. In the preferred embodiment, the activator flashtube system of the interrogator 14 is equipped with a conical optical system. The resulting activator optical field 13a is as shown in FIGS. 1, 2a and 2b. Specifically, the activator optical field 13a is at least as wide as the width of the entry lane, and is more-or-less square. The interrogator receiver field 15a is as wide as the traffic lane also, but is quite narrow in the direction of vehicle travel. Preferably, the vehicle enters the interrogator/activator field 13a well before it enters the interrogator/receiver field 15a. The intent is that the transponder 12 be turned on to its transmitting state well before it enters the interrogator receiving field 15a, so that the interrogator 14 can read transponder numbers from vehicles travelling at high speed. Note that one or more activators could be mounted above the traffic lane in order to extend the activation optical field even further in the direction opposite that of vehicle traffic if desired. In addition, the interrogator 14 is preferably set at an angle of approximately 45° relative to the vertical, as shown, so that the interrogator pulses are less apt to reflect off the windshield of an approaching vehicle, a situation which could occur if the angle at which the light strikes the window is too shallow.

The interrogator 14 regularly emits light pulses which are received by the transponder 12 within the activator field. In response to any one of these interrogator pulses, the transponder 12 begins to emit a sequence of light pulses representative of its code. When the transponder moves into the interrogator/receiver field, the interrogator/receiver receives these pulses and interprets them as a regularly timed sequence of binary 1's and 0's. The binary data rate can be in excess of 100,000 bits/second, although the data rate of the system specifically described herein is 50,000 bits/second.

While the code stored in the transponder 12 has a logic starting point and a logic ending point, the code transmitted to the interrogator 14 may be started at any point, including points intermediate the logic starting point and the logic ending point. However, since the code is repeated more than once during a single interrogation of the transponder 12 by the interrogator 14, and the code stored in the transponder 12 is selected so that the logic starting point can be identified, any random starting operation point can be accommodated.

FIG. 4a shows the electrical configuration of the activator flashtube pulser. A xenon flashtube was chosen as the preferred activation light source because it can emit light pulses of extremely high energy and of very short duration at a repetition rate which is acceptable for this application, while still exhibiting a relatively long lifetime. The particular flashtube 31 and flashtube driver module 30 chosen for use in this system are manufactured by United States Scientific Instruments and are denoted as models 3CP-5 and MCP-3, respectively. The driver module 30 provides a mounting bracket for the flashtube 31.

If appropriate optics are associated with the flashtube, the flashtube operated at an input power of 0.2 joules/flash can activate the transponder optical switch to be shown later at very great ranges with only a single flash, even through heat-absorbing windshield glass. Furthermore, if this flashtube is operated at an input power of 0.2 joules/flash with a repetition rate of 60 flashes/second, the manufacturer specifies that this flashtube will exhibit a lifetime of continuous use which exceeds 1 year.

One of the principle advantages of using this type of flashtube as the activating light source is involved with the possibility of undesirable transponder activation due to light sources other than those from an interrogator. Because of the obvious need to preserve transponder battery capacity, it is quite undesirable that the transponder be activated by optical sources in the environment other than the flashtube. The virtues of the flashtube in this regard are (1) on an instantaneous basis, its optical output is very much greater than that likely to be encountered from any other source, and (2) the very fast rise time of the light output from the flashtube (greater than one microsecond) provides a second means of distinguishing the flashtube light output from other sources; since other sources in the environment are not modulated at nearly this rate.

Figures 4B, 4C:
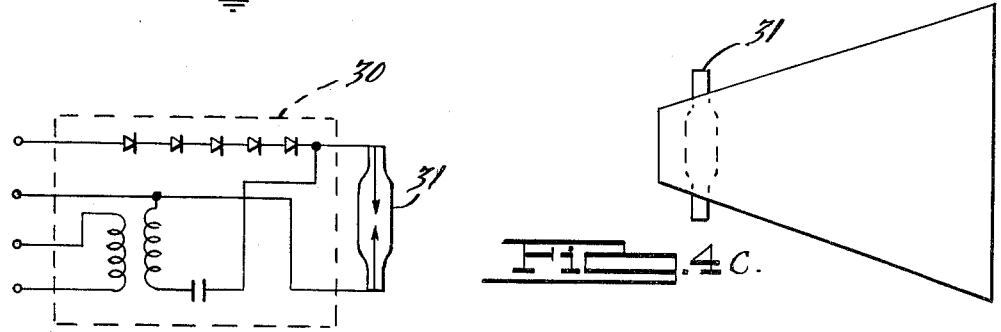

The circuitry contained in the flashtube driver 30 is shown in FIG. 4b. With this information, the circuitry of FIG. 4a can now be explained. Assume initially that the flashtube 31 is in the unfired, or quiescent, state. In that state, the flashtube 31 acts as an open circuit. Capacitor C3 is charged through R1 to 550 volts. At essentially the same time, capacitor C2 is being charged through R2 and the primary of the transformer in 30 to just less than 200 volts. At a much slower rate, capacitor C1 is being charged through R2 and R4. When the voltage at the junction of C1 and R4 on line 33 reaches the breakover voltage of diac Q1 (about 32 volts), the diac Q1 assumes a very low resistance, allowing capacitor C1 to discharge through the gate of the SCR Q2. The SCR Q2 is turned on in response to this gate current, and capacitor C2 discharges rapidly through the SCR Q2 and through the primary of the transformer in 30. The transformer secondary in flashtube driver 30 generates a brief voltage spike of approximately 5000 volts at the ungrounded end of the flashtube in response to the discharge of C2. The series high-voltage diodes in 30 prevent current leakage through C3 or R1. This 5000 volt spike occurring across the flashtube 31 causes ionization of the xenon in the flashtube. Because of this ionization, the flashtube 31 becomes conductive and, after the brief 5000 volt spike has disappeared, capacitor C3 discharges rapidly through the flashtube 30, generating a plasma between the electrodes resulting in a high intensity light output. The duration of the light output is approximately a few microseconds. Then the flashtube returns to its open-circuit condition, the diac Q1 and SCR Q2 return to their non-conducting states, the capacitors are all discharged, and the entire process is repeated.

In order for the flashtube light output to be directed into a desired volume with high efficiency, an optical energy collection system is used in conjunction with the flashtube 31. The most effective and least expensive optical system for use in most typical applications of the object identification system has proven to be a cone-optics system. The cone-optics system consists of a truncated cone with appropriate cross-section, which is constructed in such a way that the inner surface of the cone is highly reflective. A radiation detector or, in the case of the present invention, a radiation source is located at the small end of the cone at or near the point of truncation. Although a cone-optics system can neither collimate nor image, it can collect energy and direct it into a volume with rather high efficiency. The cross-sectional shape of the cone has not proven to be very critical in permitting the flashtube to strongly illuminate areas representative of traffic lanes. FIG. 4c illustrates approximately the cone shape used in the preferred embodiment. The flashtube 31 is positioned as shown. The cone is easily constructed out of metalized mylar.

In some applications of the present object identification system, it may be desirable to provide two or more activator flashtube pulsers within a single interrogator configuration. In addition, it may also be desirable to have two activator flashtube pulsers illuminating the same volume and operating in tandem, so that if one unit fails, the second unit will continue to operate while repairs are being made to the first.

As indicated by its representation in FIG. 3b, the transponder 12 is comprised of two component sections: (1) the optical switch 17 and (2) the memory and data transmission 19. The two sections in fact perform separate and independent functions, and are connected only through the power supply (battery) and through the signal connection of line 34.

Figures 4D, 5A:
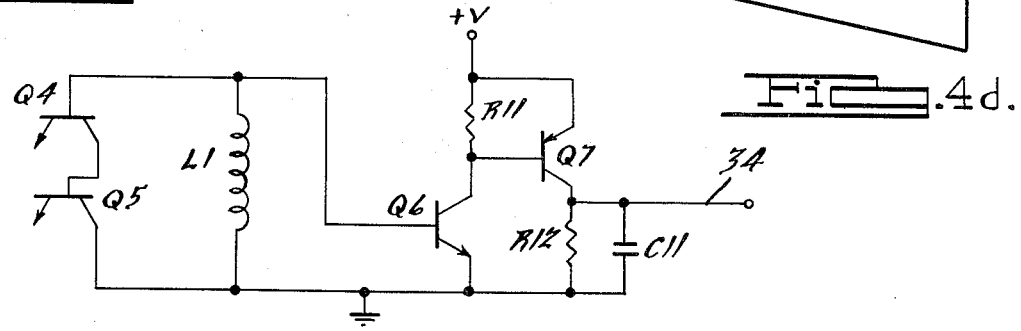
FIGS. 5a and 5b illustrate two alternative configurations of the optical switch section of the transponder.

FIG. 5a shows one embodiment of the optical switch 17. The photodetectors Q4 and Q5 shown in FIG. 5 are phototransistors connected as photodiodes. Phototransistors are used because of their low cost, although they could be replaced by photodiodes.

Normally, with little or no photocurrent flowing through Q4 and Q5, there is almost no voltage across L1, whose DC resistors is on the order of 200 ohms. Thus, transistors Q6 and Q7 are in cutoff and the voltage on line 34 is at ground potential. The only current flowing from the battery which supplies +v is the leakage current of transistors Q6 and Q7. At reasonable transistor temperatures greater than or equal to 70° C., this leakage current typically totals substantially less than 100 nanoamps. The inductor L1, whose preferred value is 91 millihenrys, appears as a low value resistance to constant or slowly changing photocurrent generated by Q4 and Q5 but as a high impedance to rapidly changing photocurrent generated by Q4 and Q5. Constant or slowly changing photocurrent will flow through L1 rather than into the base of Q6, thus leaving Q6 and Q7 in cutoff. Rapidly changing photocurrent of sufficient magnitude will, however, flow into the base of Q6, thus forward-biasing the base-emitter junction of Q6. Note that two photodiodes in series must be used to forward-bias the base-emitter junction of Q6, because one photodiode, even when fully saturated optically, cannot generate sufficient voltage to reliably forward-bias the base-emitter junction of Q6. The resulting collector current of Q6 flowing through R11 will forward-bias the base-emitter junction of Q7. The resulting collector current of Q7 will charge capacitor C11 to nearly the battery voltage, +v. Since capacitor C11 cannot discharge through Q7, it can only discharge through resistor R12 or through the input attached to line 34. However, the CMOS gate input of the memory and data transmission section 19 which is connected to line 34 draws essentially no current. Accordingly, the only significant discharge path for capacitor C11 is through resistor R12. The resistance value of R12 can be made to be arbitrarily great, so that capacitor C11 will charge very rapidly to nearly +v as the result of a received light pulse, and then take up a second, using practical resistance values for R12, to discharge to half of +v, the typical switching threshold of the CMOS gate connected to line 34 as noted above.

Thus, in response to rapidly changing photocurrent of sufficient magnitude, the circuit of FIG. 5a will supply a CMOS switching signal on line 34. Specifically, the signal on line 34 will immediately switch from a logical 0 to a logical 1 in response to said photocurrent, and remain a logical 1 for up to one second after the disappearance of the photocurrent. Photocurrent of the appropriate characteristics noted above is generated by photodiodes Q4 and Q5 in response to the light output of the activation flashtube pulser described previously at ranges of up to 14 feet from the activation flashtube pulser, with heat-absorbing glass interpassed in the optical path.

No other commonly encountered natural or artificial light source is known to be capable of activating this optical switch as shown in FIG. 5a. The sun, which is a powerful light source has not, under test, been able to activate this optical switch under any conditions, including those expected to be commonly encountered by the transponder. More exotic sources such as photographic strobes or arc welder plasmas might activate the switch, but they will not normally be encountered.

Certain applications of the object identification system may require that the transponder, and thus the optical switch within the transponder, be capable of operating at greater distances from the activator flashtube pulser than are possible with the optical switch configuration shown in FIG. 5a. The principal reason why the operating range of the optical switch of FIG. 5a is restricted to about 14 feet is that in order for the optical switch to activate, there must be sufficient photocurrent generated by photodiodes Q4 and Q5 to cause the base-emitter junction of transistor Q6 to become forward-biased. The 0.7 volts typically required at the base of transistor Q6 to forward-bias the base-emitter junction of transistor Q6 represents a threshold voltage which in turn must be generated by the photodiodes across inductor L1 in order for the optical switch to activate. If this 0.7 volt threshold can be reduced, then increased operating range for the optical switch can be realized.

Figure 5B:
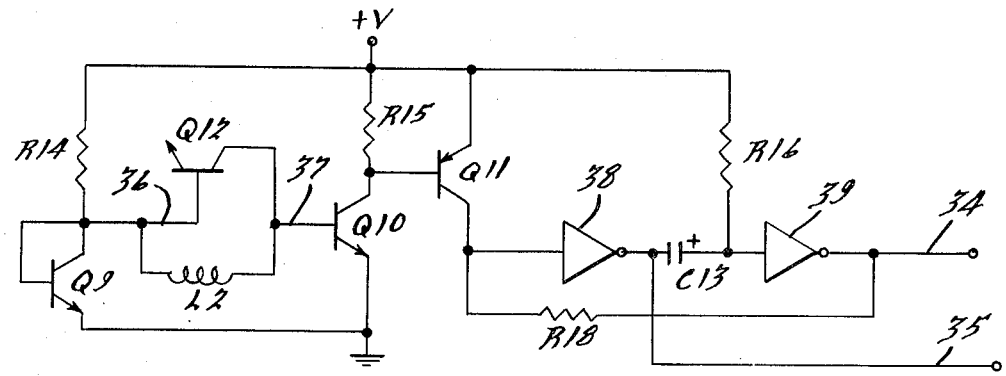

The circuit of FIG. 5b achieves this reduction in threshold voltage, at the expense of a small increase in battery current consumption. Transistors Q9 and Q10 are preferably made on a single silicon chip so that they are well-matched in characteristics and in intimate thermal contact so that their respective temperatures are essentially equal. Transistors Q9 and Q10 as configured in the circuit of FIG. 5b constitute a conventional current-source pair, assuming the resistance of L2 to be negligible. In the quiescent state, when little or no photocurrent is generated by phototransistor Q12, the collector current through transistor Q10 is the same as the collector current through the diode-connected transistor Q9, due to the characteristic and thermal matching of the two devices. The collector currents of transistors Q9 and Q10 will remain equal and nearly constant over a wide temperature range. The value of the collector current through transistor Q9 is established by the value of resistor R14 and the supply voltage +v. Thus, for a given supply voltage, the value of R14 may be chosen to forward-bias the base-emitter junction of transistor Q9 to whatever level is desired. Note that, because of the matching of transistors Q9 and Q10, the voltage at the base of transistor Q10 is the same as the voltage at the base of transistor Q9, and can be established at any value between 0 and 0.7 volts, depending on the value of resistor R14 selected. Based upon considerations discussed below, the preferred value of resistor R14 is 2.7 Mohms. With a battery voltage of 6 volts, the collector current through both transistors Q9 and Q10 is therefore about 2 microamps and the voltage on lines 36 and 37 approximately 0.525 volts at 300° K. If the base-emitter junction of transistor Q10 is fully forward-biased at 0.7 volts, then the application of only an additional 0.175 volts to the base of transistor Q10 is required to fully forward-bias its base-emitter junction. It will be recalled that in the original embodiment shown in FIG. 5a, it required 0.7 volts at the base of transistor Q6 to fully forward-bias transistor Q6. Photodiode Q12 and inductor L2 in FIG. 5b are configured to generate the additional 0.175 volts in response to rapidly changing optical signals of sufficient magnitude.

In the quiescent state, as noted earlier, the collector current through transistor Q10 is about 2 microamps. This current flows mostly through resistor R15, thus generating a voltage across the base-emitter junction of transistor Q11. With resistor R15 having a selected value of 18 Kohms, the forward-bias voltage applied across the base-emitter junction of transistor Q11 in response to 2 microamps flowing through resistor R15 is only 36 millivolts. Thus, for all practical purposes, transistor Q11 is in cutoff, and negligible collector current will flow through transistor Q11, even at elevated temperatures.

CMOS inverters 38 and 39, together with transistor Q11, comprise a monostable, or one-shot, multivibrator. In the quiescent state, transistor Q11 is in cutoff, capacitor C13 is discharged, and the input of inverter 39 is a logical 1. The output of inverter 39 is, then, a logical 0, and the input of inverter 38 is a logical 0 and its output a logical 1. When transistor Q10 becomes forward-biased in response to an appropriate optical input, the resulting collector current through transistor Q10, resistor R15 and the base of transistor Q11 forward-biases the base-emitter junction of transistor Q11. The resulting collector current through transistor Q11 and resistor R18 raises the voltage at the input to inverter 38 to nearly the supply voltage +v, which constitutes a logical 1 at that input. Thus, the output of inverter 38 changes to a logical 0 which is coupled through capacitor C13 to the input of inverter 39. The output of inverter 39 changes to a logical 1 which serves to maintain a logical 1 at the input of inverter 38 even after transistor Q11 returns to its quiescent cutoff state. A logical 1 is maintained on line 34 until capacitor C13 charges through resistor R16 to the CMOS switching threshold of inverter 39. When this occurs all of the inputs and outputs of inverters 38 and 39, including the logic level on line 34, return to their quiescent states. The values of resistor R16 and capacitor C13 and chosen to exhibit an RC time constant somewhat in excess of one second. Thus, in response to an appropriate brief optical input, the output on line 34 of the optical switch shown in FIG. 5b will immediately change from a logical 0 to a logical 1, remain in that state for about one second, and then return to a logical 0 state. The output signal on line 35 is, of course, the logical inverse of the output signal on line 34.

Thus, at the cost of about 4 microamps of battery current and some additional circuit complexity, the optical switch circuit of FIG. 5b offers a fourfold increase in optical sensitivity over the optical switch circuit of FIG. 5a. Because of the inverse square law for radiant intensity, this fourfold increase in sensitivity translates into a doubling of the operational range between the activator flashtube pulser and the transponder. Some additional sensitivity has been gained through the use of the circuit of FIG. 5b in that the collector current of transistor Q11 need only generate a logical 1 across resistor R18 in order for proper operation, whereas in the circuit of FIG. 5a, the collector current of transistor Q7 must charge capacitor C11 to nearly +v volts. A somewhat stronger optical pulse is required to accomplish the latter than is required to accomplish the former. Experimental results with the optical switch circuit of FIG. 5b show that the switch will activate at ranges up to 35 feet from the activator flashtube pulser, with heat-absorbing glass interposed in the optical path.

Note that in the circuit of FIG. 5a, the optical sensitivity of the optical switch is controlled by the value of resistor R14. The value selected, 2.7 Mohms was determined experimentally by illuminating the switch photodiodes with a number of optical sources which might be encountered by the device in actual operation, including modulated sunlight. With R14 equal to 2.7 Mohms, the switch would not activate in response to any of these sources.

Descriptions of various forms of the transponder memory and data transmission section can best be made in conjunction with descriptions of the corresponding interrogator receiver section as complete data links, since the transmitter and receiver sections are so intimately related. Accordingly, a first pair of transmitter and receiver sections comprising a data link will be presented which offer simplicity and low cost as principal virtues. This data link will be referred to as data link "A". A second alternative transmitter and receiver data link will then be presented which offers a significantly increase performance level at the expense of added complexity and cost. This second embodiment, referred to as data link "B", will be elaborated upon in detail. Variations in data link "B", including a data coding scheme which is uniquely suited to use with data link "B", and a means of remotely identifying transponder batteries which are on the verge of failure will be shown.

Data link A:

The data link A system operating at a representative data range of 50,000 bits/second uses infrared light pulses of about 2 microseconds pulse width, generated by an infrared LED located in the transponder, to transmit information. These light pulses are received by a silicon photodiode located in the interrogator receiver. Both logical 0's and logical 1's are transmitted as positive information—that is, certain pulse configurations represent logical 0's and logical 1's. The absence of a pulse is not used to indicate either a logical 0 or 1. Specifically, a logical 0 is represented by a single pulse while a logical 1 is represented by a pair of pulses closely spaced in time. FIG. 6a shows the transponder memory and data transmission section as well as the interrogator receiver which comprise data link "A".

The transponder memory and data transmission section functions as follows. When the optical switch section of the transponder is not activated, a logical 0 is supplied on line 34 from the optical switch, and a logical 1 is supplied on line 35. The output of NAND gate 40, which is connected to the clock input 14 of decade counter 42, is forced to a logical 1. Thus, decade counter 42 cannot count. Also, the reset input 15 of decade counter 42 is set to a logical 1 via line 35. Thus, decade counter 42 is reset, and the outputs of both gates 43 and 44 are logical 0's. Accordingly, since the LED driver 46 is activated only in response to a logical 1 at the output of OR gate 43, there is no power supplied to LED 47. The transponder identifying code is stored in the 64-bit static shift register 45. In the quiescent state, which exists when there is a logical 0 on line 34, no significant battery current is drawn by the transponder memory and data transmission section. Although a shift register is used in the preferred embodiment, it will be readily appreciated that other types of memory devices, such as a RAM, could be substituted with relatively minor circuit modification.

When the transponder optical switch receives an activating flashtube light pulse, a logical 1 is supplied on line 34 and a logical 0 is supplied on line 35. The oscillator, comprised of NAND gate 40, ceramic resonator X1, capacitor C15 and capacitor C16, is then free to oscillate at 500 KHz. The oscillator frequency is determined by the ceramic resonator X1, which in the preferred embodiment is a model CSB500A resonator supplied by Murata Corp. of America. Line 35 supplies a logical 0 to pin 15 of decade counter 42, removing the reset condition from decade counter 42, allowing it to count. The 500 KHz clock frequency is delivered to the clock input of decade counter 42 at pin 14 of decade counter 42. Since the decade counter is fully decoded, logical 1's appear sequentially on its ten outputs, each one having a duration of 2 microseconds. A logical 1 appears at the first count on pin 2 of decade counter 42 and a logical 1 appears at the fourth count on pin 10. Logical 1's cannot appear on pins 2 and 10 simultaneously. Note that the shift register 45 is clocked at the leading edge of the first count in the decade counter sequence on pin 2 of shift register 45. Data is recirculated from the output pin 6 to the input pin 15 of shift register 45 through resistor R19.

The timing diagram in FIG. 6b illustrates the operation of the transponder memory and data transmission section. When the first pulse, labelled No. 1, on pin 2 of the decade counter 42 appears, the shift register 45 is clocked. The output of the shift register 45 is shown making a transition from a logical 1 to a logical 0 at that time. Pulse No. 1 on pin 2 of the decade counter 42 is then transmitted through OR gate 43 to the LED driver 46 and a light pulse coincident with that No. 1 pulse is emitted. Four microseconds after the No. 1 pulse disappears, a pulse appears on pin 10 of the decade counter 42. Since the output of the shift register 45 is a logical 0, this pulse does not appear at the output of AND gate 44, is not transmitted through OR gate 43 to the LED driver 46, and no light pulse is transmitted. When the second pulse, labelled No. 2, on pin 2 of the decade counter 42 appears, the shift register 45 is clocked. The output of the shift register 45 is shown making a transition from a logical 0 to a logical 1 at that time. Pulse No. 2 on pin 2 of the decade counter 42 is transmitted through OR gate 43 to the LED driver 46 and a light pulse coincident with that No. 2 pulse is transmitted. Four microseconds after the No. 2 pulse disappears, a pulse appears on pin 10 of the decade counter 42. Since the output of the shift register 45 is a logical 1, this pulse appears at the output of AND gate 44, is transmitted through OR gate 43 to the LED driver 46, and a light pulse is transmitted. FIG. 6b, then, illustrates the means by which a binary 0 and a binary 1 are transmitted.

The pulses emitted by the transponder LED 47 are received by a silicon photodiode 48 in the interrogator receiver. The silicon photodiode generates photocurrent in response to the received light pulses which is translated into a voltage signal and amplified by analog amplifier 49. The output of analog amplifier 49 is applied to the positive input of a differential comparator 50. To the negative input of differential comparator 50 is applied a fixed positive threshold voltage whose magnitude is somewhat greater than the peak noise level generated by the detector and/or analog amplifier. The output of differential comparator 50 is a digital signal which is logical 1 whenever the signal on line 53 exceeds the threshold voltage applied to the negative input of differential comparator 53, and is a logical 0 otherwise. The non-retriggerable one-shot multivibrator 51 which has a period of 7 microseconds, fires upon the receipt of a positive-going signal at its trigger input. Its $\overline{Q}$ output changes at that time from a logical 1 to a logical 0, and remains at a logical 0 for the 7 microsecond period, after which time the $\overline{Q}$ output returns to a logical 1. When the $\overline{Q}$ output of one-shot 51 changes from a logical 0 to a logical 1, shift register 52 is clocked and the logical state existing at the input of shift register 52 at the time of clocking is shifted into the first position of shift register 52.

The timing diagram shown in FIG. 6c illustrates the operation of the interrogator receiver of FIG. 6a. The comparator 50 converts the analog signal on line 53 to a digital facsimile of the transponder light output shown in FIG. 6b. The one-shot 51 triggers at the beginnings of the time periods labelled 1, 3 and 5. Because it is a non-retriggerable one-shot, it cannot be triggered during the time periods marked 2, 4 and 6. The $\overline{Q}$ output of the one-shot 51 acts as the clock for shift register 52, and shifts data into the shift register 7 microseconds after it is triggered. Since the input of shift register 52 is connected to the output of comparator 50, the state of the shift register can be seen in FIG. 6c at the times when it is clocked. During time period 2, a logical 1 is shifted into the first stage of the shift register. During time period 4, a logical 0 is shifted into the first stage of the shift register. During time period 3, a logical 1 is shifted into the first stage of the shift register, etc. Thus, the binary word contained in the transponder is loaded into the interrogator receiver circuitry.

Additional signal processing is necessary to provide adequate redundancy within the received binary number and to detect an appropriate number start code. If shift register 52 is a 64-bit serial-in, parallel-out shift register, a modified form of the coding and redundancy shown in U.S. Pat. No. 4,121,102 could be used directly. An alternative coding scheme which could also be used will be subsequently described herein.

Data link B:

The data link B system operating at a representative rate of 50,000 bits/second uses infrared light pulses of about 2 microseconds pulse width, generated by an infrared LED located in the transponder, as the transmission medium.

In data link B, a single light pulse is used to represent a logical 1 and the absence of a pulse represents a logical 0. More precisely, the lack of a pulse within a certain time period represents a logical 0. There will be spaces between pulses even when subsequent logical 1's are transmitted. The interrogator receiver must know when to look for logical 0's.

This is accomplished by using correlated clock frequencies in both the transponder and interrogator receiver. The clock in the interrogator receiver periodically has its phase synchronized with the phase of the clock in the transponder. Since the transponder transmits data in synchronism with its own clock, the interrogator receiver can, via its internal clock which is partially synchronized with the transponder clock, anticipate the times at which data pulses should be transmitted. Phase synchronization between the two clocks is accomplished by the transmission and reception of logical 1's.

Regardless of the accuracy of the two clocks or how well they are correlated, they will stay in near synchronism for only a short time if they operate independently. However, if the clock in the interrogator is reset periodically to match the clock in the transponder, the two clocks can be made to operate nearly synchronously, and the clock in the interrogator can be used to tell when to look for logical 0's.

FIG. 7a shows the transponder memory and data transmission section as well as the interogator receiver which comprise data link "B".

Note that the transponder memory and data transmission sections of FIGS. 6a and 7a are almost identical. The only difference is that in the circuit of FIG. 7a, OR gate 43 is omitted and the output of AND gate 44 is connected directly to the input of the LED driver. Thus, the timing diagram contained in FIG. 6b and the associated explanation thereof is otherwise equally applicable to the transponder memory and data transmission section of FIG. 7a. Essentially, the only operational difference between the two circuits is that the pulses appearing on pin 2 of decade counter 42 are not transmitted to the LED driver in the circuit of FIG. 7a. Referring to the timing diagram of FIG. 6b, the light output of LED 47 in the circuit of FIG. 7a will be coincident with the output of AND gate 44. Thus, a logical 1 is represented by a light pulse and a logical 0 is represented by the lack of a light pulse. The interrogator receiver must translate received light pulses into the identical binary bit sequence as is contained in the transponder memory.

The pulses emitted by the transponder LED 47 are received by silicon photodiode 48 in the interrogator receiver. The silicon photodiode generates photocurrent pulses in response to the received light pulses, which are linearly translated into voltage pulses and amplified by analog amplifier 60. Analog amplifier 60 also shapes the voltage pulses in order to enhance the system signal-to-noise ratio. The output of analog amplifier 60 is delivered on line 67 to the inverting input of differential comparator 61. To the other input of comparator 61 is applied a threshold voltage which is somewhat higher than the peak noise level observed on line 67. When the output voltage of the analog amplifier 60 exceeds the threshold voltage, the output of the comparator switches to a logical 0. Otherwise, it is a logical 1. Specifically, when the interrogator receiver receives a light pulse of sufficient magnitude that the voltage output of the analog amplifier exceeds the threshold voltage, the output of comparator 61 will change from a logical 1 to a logical 0. This output step is passed through a differentiator consisting of resistor R22 and capacitor C17 which converts the leading edge of this output signal into a negative-going voltage spike. This voltage spike is squared and inverted by inverter 62, so that the output of inverter 62 on line 66 is a positive-going pulse of less than one microsecond duration. Inverter 63, resistor R23 and crystal X2 consitute a 5 MHz oscillator which clocks decade counter 64. The "carry out" output of decade counter 64 clocks decade counter 65. The two decade counters 64 and 65 connected as shown constitute a divide-by-100 frequency divider. The output frequency on any of the "0"-"9" outputs is 5 MHz divided by 100, or 50 KHz. This frequency is the same, within component tolerance error, as the transponder data bit rate of 50 K bits/second. Note that when decade counter 65 is reset, the "0" output becomes a logical 1.

The exemplary timing diagram of FIG. 7b can be used to explain the rest of the operation of the system, starting with the synchronizing signal generated on line 66 in response to a received light pulse. In the example shown, light pulses representing logical 1's are received and translated into the electrical pulses on line 66 noted as 1, 2 and 3. No pulse occurs between 2 and 3, so a logical 0 exists therebetween. The pulse at the output of inverter 62 on line 66 accomplishes simultaneously two things:

(1) it resets the decade counters 64 and 65, thus temporarily synchronizing the transponder and interrogator clocks to within a 1 percent phase error, the two clocks being represented by the respective outputs of decade counters 42 and 65; and (2) it sets D-flip flop 68, so that the Q output of D-flip flop is forced to a logical 1. When the pulse on line 66 disappears, all of the circuitry remains in the state just described except for decade counter 65, which begins counting according to receipt of clock pulses from decade counter 64. When the "5" output of decade counter 65 changes from a logical 0 to a logical 1, the logical 1 contained on the Q output of D-flip flop 68 is shifted into the first stage of shift register 69 and the Q output of D-flip flop 68 is shortly thereafter reset to zero. Thus, a received optical pulse has been transformed into a logical 1 and stored in the first stage of the shift register. When any subsequent optical pulses are received, the process is repeated as noted for pulses 1 and 2 on line 66.

However, if the next bit in the transponder shift register is a logical 0, then no optical pulse will be transmitted or received. This situation is illustrated by the lack of a pulse on line 66 between pulses 2 and 3. The interrogator clock has been temporarily synchronized with the transponder clock so that the interrogator knows approximately when the transponder shift register will shift a new data bit to the transponder LED driver. If no optical pulse is received, decade counters 64 and 65 keep counting uninterrupted. The Q output of D flip flop 68, which was reset earlier to a logical 0, remains at a logical 0 through the time at which the "5" output of decade counter 65 changes from a logical 0 to a logical 1. Thus, the logical 0 at the Q output of D flip flop 68 is shifted into the first stage of shift register 69. Subsequent logical 0's, represented by the lack of optical pulses at appropriate times, are translated into logical 0's and stored in the shift register 69 in the same way. Eventually, the shift register in the interrogator receiver will become loaded with the same data word as exists in the transponder shift register.

Of course, the clocks in the transponder and interrogator receiver do not exhibit exactly the same frequencies, and thus they will drift apart in phase after an initial phase synchronization caused by the receipt of a light pulse by the interrogator receiver. As a result of the above, the reception by the interrogator receiver of a logical 1 followed by a long series of logical 0's could cause an erroneous bit to be shifted into shift register 69. Phase error between the two clocks accumulates with the reception of each additional logical 0. A study of FIG. 7b shows that the phase of one clock relative to the other can shift up to a maximum of ±180° before an erroneous bit will be shifted into shift register 69. For example, consider the case where the ceramic resonator X1 in the transponder and the crystal X2 in the interrogator receiver are matched to within ±½ percent frequency. A ±½ percent frequency mismatch corresponds to about ±1.8° of phase difference per clock cycle. Thus, it would take 100 clock cycles to accumulate a phase error of ±180°. Thus, the interrogator receiver could conceivably receive up to 100 logical 0's in a row without error. A 64-bit data word containing only a single logical 1 could be successfully received. It is not difficult to obtain ceramic resonators and crystals whose resonance tolerance is within ±½ percent.

Once the transponder data word is successfully transferred into shift register 69 in the interrogator receiver, additional signal processing to provide adequate redundancy within the received binary number and to detect an appropriate number start code must be incorporated. As mentioned earlier, there are many forms which such additional signal processing can take.

It should be recognized that the data link "A" system does not require the accurate clock frequencies which is required by the data link "B" system. On the other hand, the data link "A" system requires, on the average, 1½ pulses per transmitted data bit, while the data link "B" system only uses, on the average ½ of a pulse per transmitted data bit. If both systems are transmitting with the maximum allowable average LED power, the pulses of the data link "B" system can have three times the amplitude of the pulses in the data link "A" system. A factor of three in light pulse intensity increases the operational range of communication by a factor equal to the square root of three which is rather substantial.

Primarily because of the increased operational range, the data link "B" system is considered to be the preferred embodiment which a non-synchronous object identification system, particularly when the data link "B" system includes the improvements to be subsequently described. A data coding scheme has been developed which is uniquely applicable to use with data link "B". Numerical information is stored in successive memory cells of the transponder memory in such a way that each bit of the encoded number is followed immediately by its compliment. For example, let us say that the binary number stored in the transponder is A, B, C, D, E,- Then the number which is stored in successive stages of the transponder shift register or other memory device is A, $\overline{A}$, B, $\overline{B}$, C, $\overline{C}$, D, $\overline{D}$, E, $\overline{E}$,- The form given above is the order in which the bits would be transmitted by the transponder. Note, that no more than two logical 0's or two logical 1's can occur in succession with this coding scheme. Thus, the start of the number can be very simply determined by inserting a succession of more than two bits which are either logical 0's or logical 1's. The starting code which has been selected is the binary sequence 1110. The use of this particular starting code avoids certain ambiguities which could arise if the starting code were 1111 or 0000. Consider the case of using 1111 as the starting code. If a logical 1 either preceded the starting code or followed the starting code, it would require an examination of the whole data word. No such ambiguity exists with the starting code 1110. It is always unique, given the coding rule for the numerical information. If this coding scheme is used to constitute the code in the transponder's 64-bit shift register, 4 bits would be used for the starting code and the remaining 60 bits would contain a 30 bit binary number. This is equivalent to a decimal number capacity of over one billion distinct numbers.

The use of this coding scheme, hereinafter referred to as coding scheme B, in conjunction with data link B offers a number of advantages. Because the total number of logical 1's in any encoded data word is constant, the duty cycle of the transponder LED is precisely known, and the LED can be operated at its maximum allowable power level. In addition, since there can never be more than two logical 0's in a row in the encoded data word, the clocks in the transponder and interrogator receiver need not be matched in frequency any closer than ±15 percent. Also, because there is so much internal redundancy within the encoded data word, reception by the interrogator receiver of only one complete word cycle, wherein the received word is found by the interrogator receiver to obey all of the coding rules given above, is sufficient for the interrogator receiver to decide that it has received a valid data word.

A complete object identification system according to the present invention using the coding scheme B in conjunction with the data link "B" configuration will now be described. FIG. 8 illustrates a transponder circuit for use in a data link B system. The dashed lines indicate the separation between (1) optical switch and (2) memory and data transmission sections of the transponder. Note that the optical switch section is identical to that shown in FIG. 5b, except that only the output on line 35 is used. The memory and data transmission section is functionally identical to that shown in FIG. 7a. NOR gate 41 is used for the strobed clock rather than the NAND gate 40 shown in FIG. 7a, and NAND gate 71 and inverter 72 in FIG. 8 comprise the equivalent of AND gate 44 in FIG. 7a. A delay network comprised of resistor R25 and capacitor C20 delays the signal delivered to the reset terminal 14 of decade counter 42 to insure that the clock signal at pin 15 of decade counter 42 will have ceased before the counter is reset. Otherwise, it is possible that a very narrow pulse can occur on the output pin 2 of decade counter 42, which provides the clock signal for shift register 45. If pulses of insufficient width occur at the clock input of shift register 45, the shift register can lose some of its stored data. The positive supply voltage provided at pin 16 of shift register 45 is decoupled from the battery voltage +v by diode-connected transistor Q15, resistor R26 and capacitor C21. This is done to insure that shift register 45 will not lose its stored data in the event that the battery is momentarily disconnected from the circuit. The battery voltage +v is bypassed by capacitor C22.

The LED driver circuit is shown in detail. In the quiescent ratio, the output of inverter 72 is a logical 0, and both transistors Q13 and Q14 are in cutoff. The leakage path provided by resistor R27 assures that transistor Q14 will not be turned on by collector leakage from transistor Q13. When data is being transmitted and the output of inverter 72 goes to a logical 1, base driver is provided to the base of transistor Q13, turning transistor Q13 on. The resulting collector current flowing into Q13 forward-biases LED 73, which can be a visible or an infrared LED. LED 73 acts as a voltage regulator, so that the voltage across the LED 73 is largely independent of the current through it, and equals approximately 2 volts. Transistor Q14 as configured with resistor R28 comprises a voltage-controlled current source. When LED 73 is forward-biased, the voltage at the base of transistor Q14 dictates that a controlled amount of current will be supplied to the output infrared or visible LED 47, independent of the supply voltage above a minimum supply voltage of approximately 3 volts.

The interrogator receiver of the data link B system can be divided into three sections: (1) analog signal processing, including radiation detector, optics, and analog amplifiers. (2) the portion of the digital processing which extracts the received binary bit sequence from the analog processing output, and (3) additional digital processing which detects the starting code and determines whether received data is valid according to the rules of the coding scheme B.

The radiation detector used preferably comprises an array of 20 separate detectors mounted behind a glass window in a 20-pin dual-in-line package. A detector array having this configuration is manufactured by Centronic, No. LD-20. The detector assembly is mounted behind a fresnel lens, centered upon the optical axis, with the front surface of the detectors lying in the focal plane of the lens. For a short-range system designed to operate with transponders nominally 8½ feet from the interrogator receiver, such as would be the case in most parking garages, a model 50-AL lens manufactured by 3M Co. is preferred. For a long-range system designed to operate with transponders nominally 17 feet from the interrogator receiver, such as would be the case in most toll road applications, a model 150-AL lens also manufactured by 3M Co. is preferred. The focal lengths of the two lenses are one inch and two inches and their diameters are three inches and 3.1 inches, respectively. The filter characteristics plus the spectral response of the silicon detector itself assure that the system will be sensitive to radiation at the emission wavelengths of the infrared or visible LED and relatively insensitive to radiation at other wavelengths.

Figure 9:
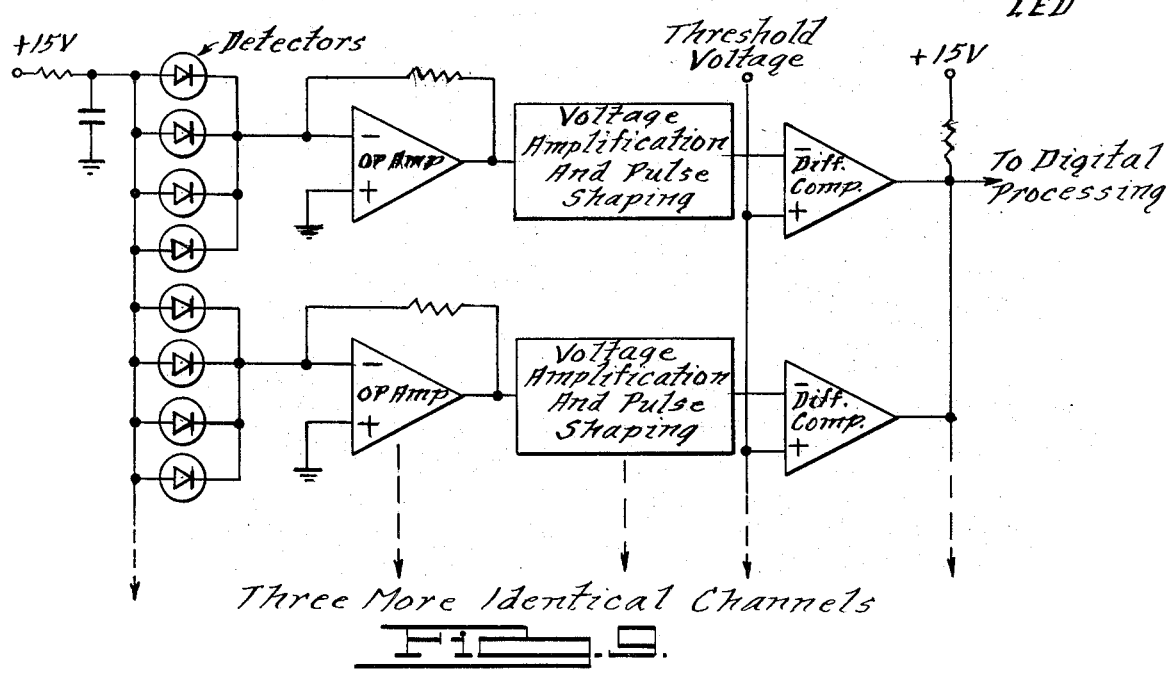
FIG. 9 illustrates one embodiment of the detector, amplification and conversion section of the interrogator.

To minimize overall system data error, it is preferable that the required interrogator detector area by satisfied using a large number of individual detectors comprising the same total area, with each detector signal being separately amplified and compared to a threshold voltage by a differential comparator before being logically OR'd together to obtain a composite signal which would then be further processed by the digital circuitry shown for a single analog channel in FIG. 7a. Using the 20-element detector array optimally, then, each of the 20 detector signals would be separately amplified and fed to a differential comparator, and the 20 differential comparator output signals would be logically OR'd. Experimental results under realistic operating conditions have indicated that the use of five groups each comprised of four adjacent detectors wired in parallel, with the composite signal from each group being amplified separately and delivered to a differential comparator, offers more than adequate performance. In effect, then, each group of four detectors acts as a single detector having the total detector area of four detectors. A detector and analog amplifier configuration of this type is shown in FIG. 9. Also shown are the differential comparators with their outputs hard-wire OR'd.

Figure 10:
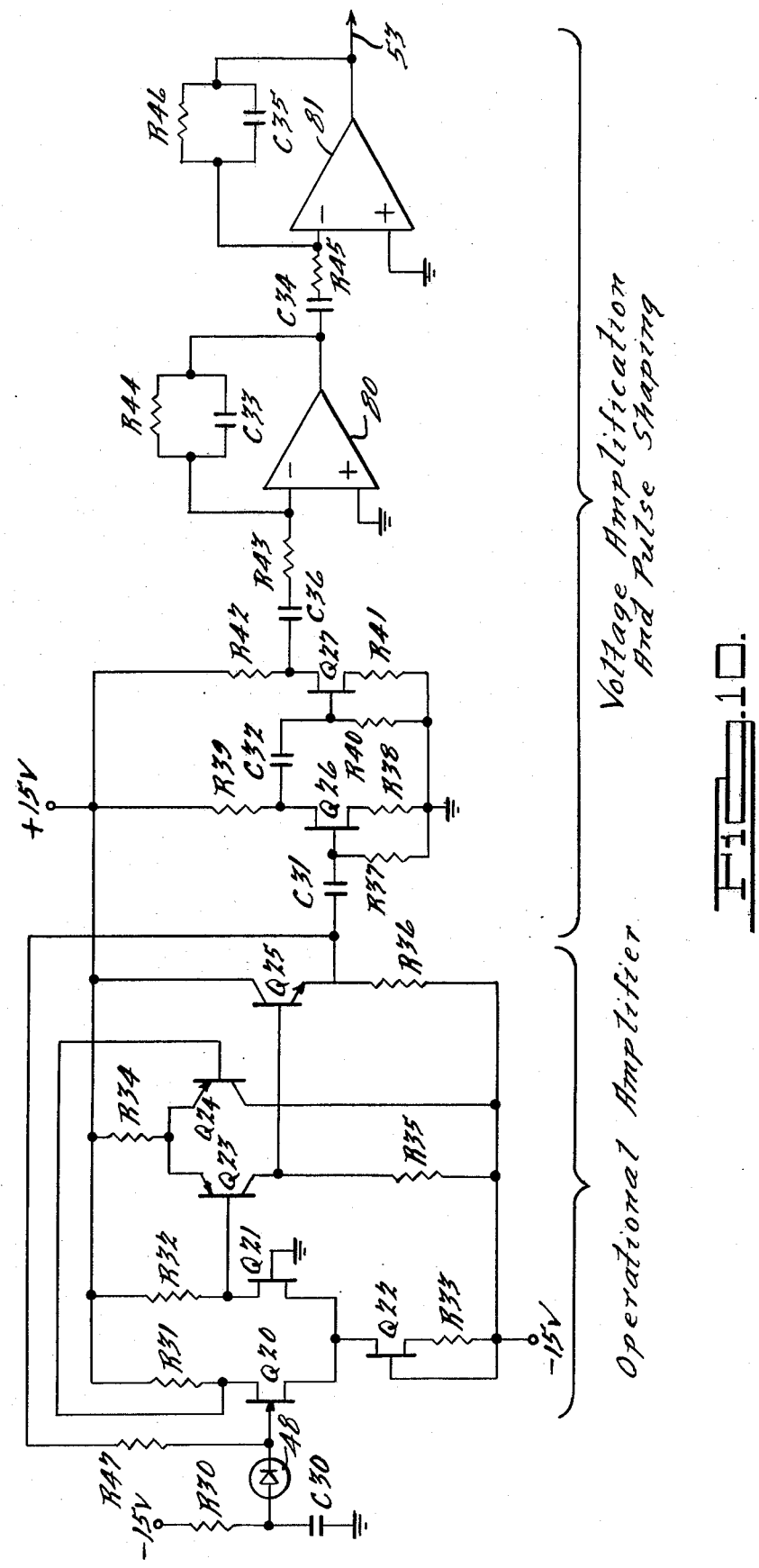
FIG. 10 is a circuit diagram of one channel of the analog amplifier circuitry of FIG. 9.

One channel of the analog amplifier is shown in FIG. 10. Note that the four detectors in FIG. 10 are illustrated as a single detector in FIG. 11. The input of the operational amplifier is connected in such a way that it linearly converts detector photocurrent to output voltage. The operational amplifier itself is of conventional design. Field-effect transistors are used in the front end because they will generate less noise and more electrical bandwidth than will bipolar transistors in this application. The voltage amplification and pulse shaping network consists of four stages, all of which are conventional in design. The last two stages utilize integrated-circuit operational amplifiers, 80 and 81 so that the filtering action is well-defined and a low value of DC offset is exhibited.

Figure 11:
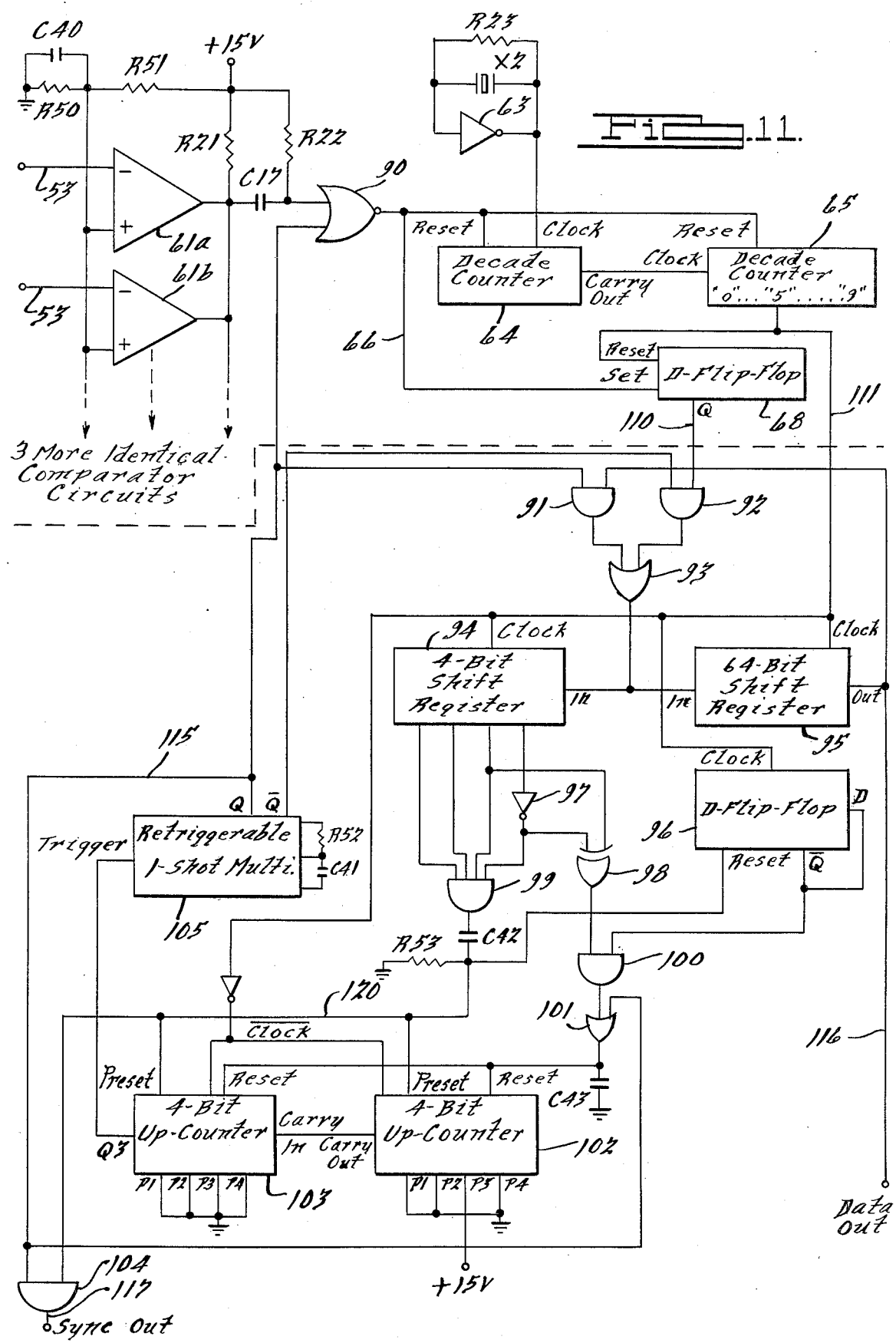
FIG. 11 is a circuit diagram of the digital processing circuitry of the interrogator receiver to receive and decode data.
Figure 13:
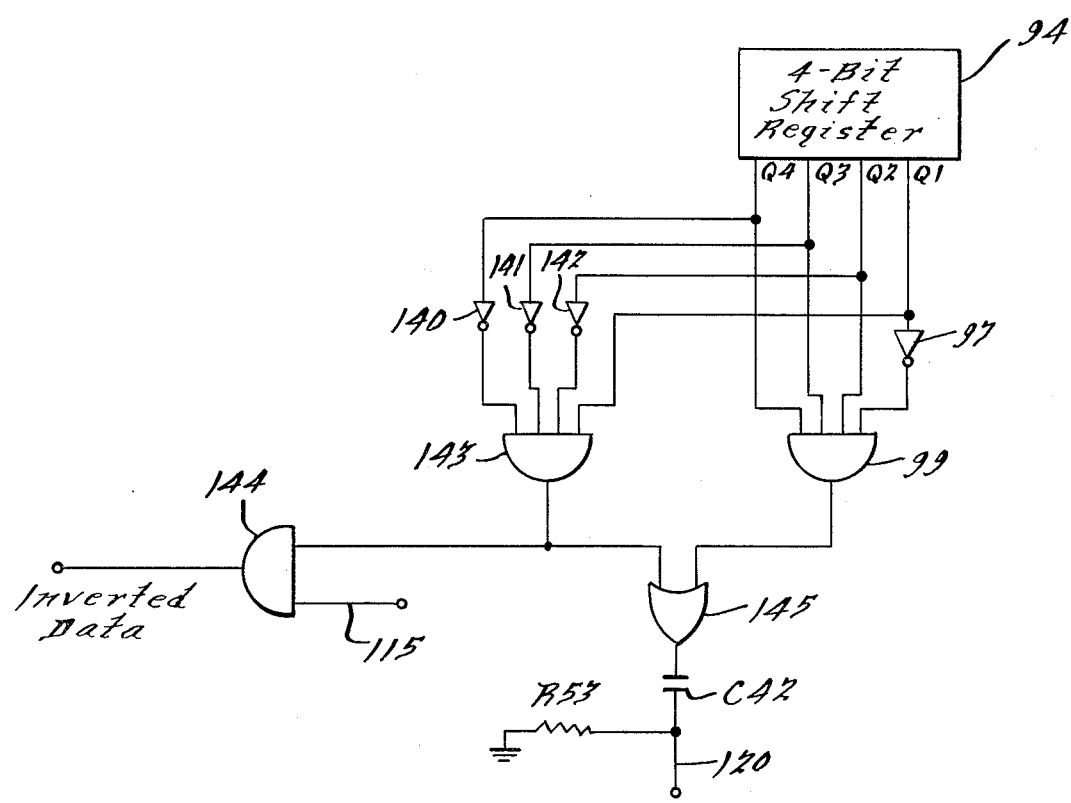
FIG. 13 illustrates the corresponding modifications to the interrogator circuitry of FIG. 11 which allows the interrogator receiver to remotely identify a transponder according to FIG. 12 which contains a weak battery.

FIG. 11 illustrates the complete digital processing circuit of the interrogator receiver for use in a data link "B" system. This circuitry translates the information received from the analog amplifiers into a binary bit sequence, determines whether the bit sequence is consistent with the rules of the preferred coding scheme B described previously, generates a sync pulse which indicates the start of the numerical binary word, and transmits this sync pulse along with the binary bit sequence. The five analog output signals from the voltage amplification and pulse shaping networks are connected to the negative inputs of five differential comparators 61a, 61b, etc. A threshold voltage generated by the voltage divider network comprised of resistors R50 and R51, and bypass capacitor C40, is applied to the positive inputs of the comparators. Whenever any of the analog signals exceeds the threshold voltage, the outputs of all of the comparators will switch from a logical 1 to a logical 0. In the normal state when the interrogator receiver is searching for valid data, the one-shot multivibrator 105 is in its quiescent state and the Q output of the one-shot 105 is a logical 0. With the Q output of one-shot 105 LO, NOR-gate 90 acts as an inverter with respect to the digital output signal from comparators 61. Thus, it will be appreciated that the circuitry above the dashed line in FIG. 13 is functionally identical to the interrogator receiver circuitry described in FIG. 7a. Accordingly, an explanation of the operation of this circuitry will not be repeated.

When the interrogator receiver receives data, serial binary data is transmitted on line 110 and the clock signal associated with the data is transmitted on line 111. With one-shot 105 in the quiescent state and its Q and $\bar{Q}$ outputs equal to a logical 0 and a logical 1, respectively, the data selector, comprised of AND gates 91 and 92 and OR gate 93, will transmit data from the Q output of D flip flop 68 to the inputs of shift registers 94 and 95. The data is then clocked through both shift registers simultaneously. The parallel outputs Q1–Q4 of shift register 94 allow the data to be examined as it is clocked through the shift registers to see whether the data conforms to the coding rules of data scheme B. First, the four-bit starting code is sought. When it appears on the four parallel outputs Q1–Q4 of shift register 94, then successive pairs of bits appearing after the starting code are examined. When 30 successive pairs of bits immediately following the starting code have been found to be complimentary logical pairs, then the 64-bit word now contained in the 64-bit serial shift register 95 is considered to be a valid word.

The manner in which the digital circuitry of FIG. 11 examines the data and makes a determination as to data validity will now be explained. If the starting code bit sequence exists in the serial data, then at some time Q4, Q3, Q2 and Q1 of shift register 94 must equal, respectively 1110. The Q1 bit is inverted by inverter 97 so that logical 1's appear on all of the inputs to AND gate 99. When the starting code appears on the Q1–Q4 outputs of shift register 94, then the output of AND gate 99 will go from a logical 0 to a logical 1. This transition is differentiated by resistor R53 and capacitor C42 so that a pulse of considerably less width than a clock pulse on line 111 appears on line 120. This pulse will be referred to as the sync pulse. When the sync pulse is produced, the first four bits of the potential data word have already been clocked into both shift registers 94 and 95. Due to the +15 volt connection to input pin P3 of counter 102, the sync pulse also serves to load the 8-bit counter, comprised of 4-bit counters 102 and 103, with the binary number "4". If the 8-bit counter 102, and 103, which receives clock pulses on line 111, accumulates 60 more counts before it receives a reset pulse or another sync pulse, then the 64-bit word which will then be contained in shift register 95 will be deemed a valid data word. Clearly, if the 8-bit counter 102 and 103 receives another sync pulse before 60 more counts have been accumulated, the coding rules of coding scheme B will have been violated, and the data contained in shift register 95 will be invalid. A reset pulse will occur at the reset inputs of 4-bit counters 102 and 103 only if a pair of bits subsequent to the starting code if found not to be a complimentary pair. Subsequent pairs of bits are compared by exclusive-OR gate 98. One input of gate 98 receives the Q2 output of shift register 94 while the other input receives the inverted Q1 output of shift register 94. The two inputs of exclusive-OR gate 98 will match when the starting code is present at the Q1–Q4 outputs of shift register 94, thus making the output of gate 98 go LO. Assuming that the data received conforms to the rules of coding scheme B, the inputs to gate 98 will match again when shift register 94 has been clocked twice, and again thereafter each time shift register 94 is clocked twice. In other words, the inputs to gate 98 will match after every even numbered clocking of shift register 94 following production of the sync pulse, until the starting code and 60 subsequent bits have been loaded into shift register 95. The two inputs to gate 98 may or may not match after odd numbered shift register clockings.

The output of exclusive-OR gate 98 is connected to one input of AND gate 100. The other input to AND gate 100 is connected to the $\bar{Q}$ output of D flip flop 96. D flip flop 96 is reset by the sync pulse and is thereafter adapted to count clock pulses on line 111 so that its $\bar{Q}$ output is HI only when the two inputs of exclusive-OR gate 98 should match, if the data is valid. Thus, the output of AND gate 100 will remain LO until a valid data word has been loaded into shift register 95. It should be noted at this point that because of various gate delays, very narrow pulses may appear at the output of AND gate 100 even when valid data is being received. Capacitor C43 is therefore provided to eliminate these narrow pulses by bypassing them to ground before they can cause the counters 102 and 103 to reset. If the two inputs to exclusive OR gate 98 do not match when they should, (i.e., when the $\bar{Q}$ output of D flip flop 96 is HI), then the data is invalid and a HI signal is produced at the output of AND gate 100 which is then transmitted through OR-gate 101 to the reset inputs of 4-bit counters 102 and 103, preventing the counters from attaining a count of 64.

Upon attaining a count of 64, the Q3 output of counter 103 will make a transition from a logical 0 to a logical 1. This transition will trigger the retriggerable one-shot 105 causing the Q and $\bar{Q}$ outputs of one-shot 105 to change to a logical 1 and a logical 0, respectively. NOR gate 90 is thus disabled, so that the clock signal on line 111 will be unaffected by incoming data. AND gate 92 is similarly disabled and AND gate 91 is enabled so that the data at the output of shift register 75 will be recirculated back to its input and to the input of shift register 94. Sync signals will still be generated at the correct time relative to the data bit sequence. Also, with the signal on line 115 being a logical 1, AND gate 104 will transmit the sync signal to line 117 labelled SYNC OUT. The valid data and will be transmitted on line 116, labelled DATA OUT. The DATA OUT and SYNC OUT lines carry the coded information to peripheral equipment. The appearance of a sync signal on the SYNC OUT line 117 serves to alert the peripheral equipment that valid data exists on the DATA OUT line 116. The logical 1 on line 115 also resets the counters 102 and 103 through AND gate 101, so that the digital circuitry will have to go through the entire validation process described above in order to obtain another valid data word.

The one-shot 105 will remain in the fired state for a period of time which is adequate to insure that the data word has been completely transmitted to the peripheral equipment, but is sufficiently short to insure that the system will be prepared to accept new data when another vehicle passes under the interrogator. For parking facility applications, 50 milliseconds has been found to be adequate. The length of time during which one-shot 105 remains fired depends upon the values of timing resistor R52 and timing capacitor C41. When the one-shot 105 returns to its quiescent state, the system begins to search for new data.

An additional feature which can readily be incorporated into an object identification system using data link B and coding scheme B is a means by which a weak transponder battery, one which is on the verge of failure, can be identified remotely by the interrogator receiver. Transponder battery lifetime is difficult to predict because it depends upon so many variables. Frequency of usage, temperatures to which the battery has been subjected, and initial manufacturing variations all contribute to the useful lifetime of the battery. Since transponder failure is an undesirable event, batteries have heretofor been routinely changed according to a very conservative schedule. Many batteries have surely been replaced which had expended only $\frac{1}{3}$ to $\frac{1}{2}$ of their useful life. Thus, the ability to remotely identify those transponders containing marginal batteries is of considerable value.

Many battery types, particularly the alkaline batteries routinely used in transponders, indicate their remaining capacity to supply power by the voltage which they exhibit under load. An alkaline battery loaded by a constant resistance will exhibit an output voltage which decreases linearly with time until a critical value of voltage is reached, after which the rate of decrease accelerates. It would therefore be desirable for the transponder to be able to recognize when its battery voltage had reached a value somewhat higher than this critical value and modify the way in which it transmitted its code in some manner that was recognizable by the interrogator receiver, so that batteries in transponders could be called in for battery replacement only when needed. It is felt that batteries changed according to this criterion could deliver about 90-95% of their useful life.

Figure 12:
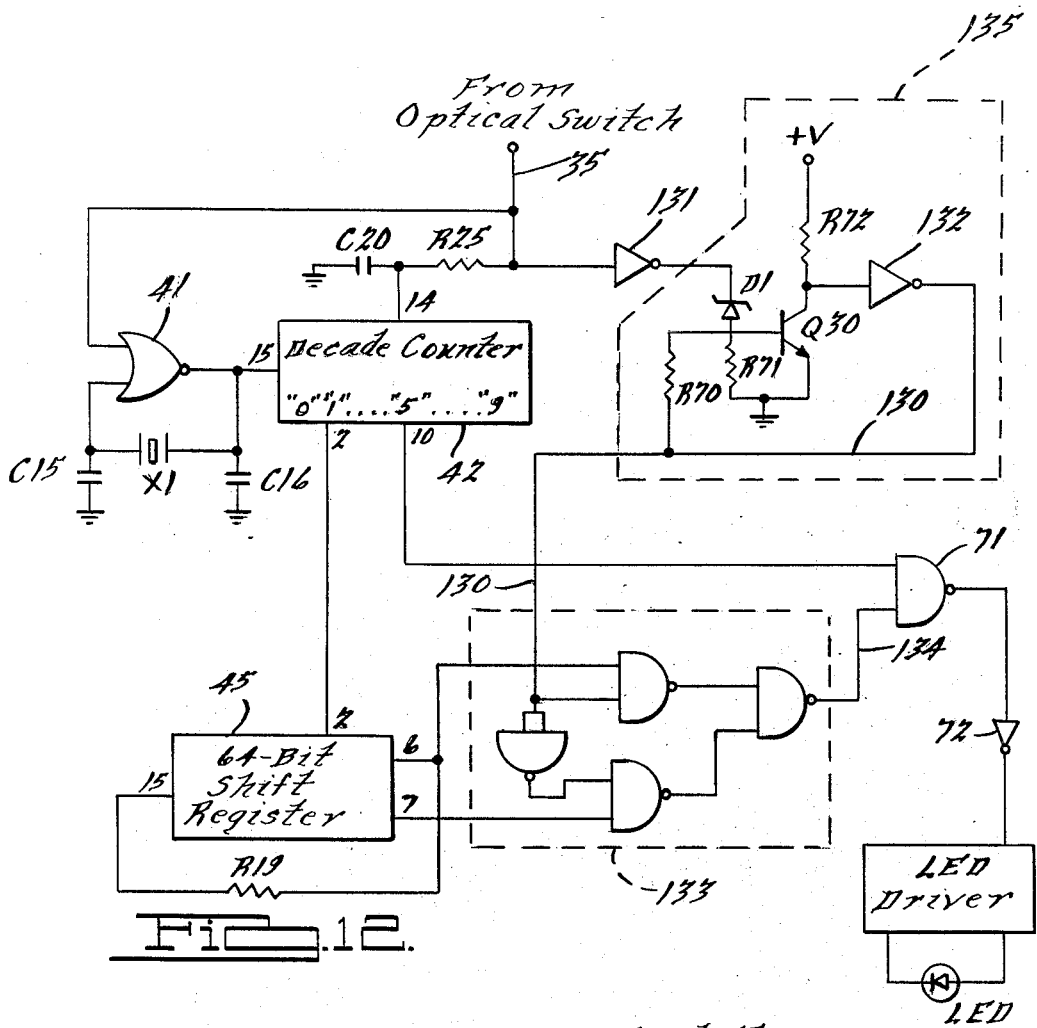
FIG. 12 illustrates an alternative embodiment of the transponder design of FIG. 8 which permits remote detection by the interrogator receiver of a weak transponder battery.

Shown in FIG. 12 is a modification to the transponder of FIG. 8 which will accomplish the above. The coding scheme used is coding scheme B. The optical switch section of the transponder is not involved in this modification and therefore is not shown. Similarly, since the LED driver and the supply bypassing are also not effected by this modification, the details of their operation will be omitted as well. When the signal on line 35 goes LO, the transponder memory and data transmission section is activated, and the output of inverter 131, which is normally LO, goes HI. The output of inverter 132 is also normally LO because transistor Q30 is normally in cutoff. If the output of inverter 131 is greater than the zener voltage of zener diode D1 plus about 0.6 volts, then the base-emitter junction of transistor Q30 becomes forward-biased. As a result, collector current flows into transistor Q30 and the input of inverter 132 changes to a logical 0, forcing the output of inverter 132 to change to a logical 1 on line 130. Some positive feedback is supplied to the base of transistor Q30 via line 130 to add hysterisis to the process. If the output of inverter 131 is less than the zener voltage of zener diode D1 plus about 0.6 volts, then transistor Q30 will remain in cutoff and the output of inverter 132 will remain a logical 0. The circuit enclosed by dashed line 133 is an AND-OR-INVERT network. If line 130 is a logical 1, then the data on pin 6 of shift register 45 is transmitted via line 134 to the LED driver. If line 130 is a logical 0, then the data on pin 7 of shift register 45 is transmitted via line 134 to the LED driver. Pins 6 and 7 of shift register 45 are, respectively, the Q and $\bar{Q}$ outputs of shift register 45. Thus, if the supply voltage is greater than the zener voltage of zener diode D1 plus about 0.6 volts, then data according to coding scheme B is transmitted by the output LED. If the supply voltage is less than the zener voltage of zener diode D1 plus about 0.6 volts, then the inverse of the data according to coding scheme B will be transmitted by the output LED. By selection of the appropriate zener diode, then, the transponder will transmit data in one of two forms, depending upon how near the transponder battery is to the end of its useful life.

The interrogator receiver must be able to receive the data word from the transponder no matter which of the two forms the data word is in, determine whether the data word is valid according to the rules of coding scheme B, and provide an indication as to which of the two forms the data word was received. The addition of a small amount of circuitry to that shown in FIG. 11 will accomplish all of the above. This circuitry is shown in FIG. 13.

The added circuitry consists solely of CMOS elements 140-145 and the connections made thereto. Otherwise, the circuitry shown in FIG. 11 remains the same. If the code received by the interrogator receiver is in the normal form of data coding scheme B, then the inputs to AND gate 143 can never be all logical 1's and the output of AND gate 143 will remain a logical 0. Likewise, the output of AND gate 144 will remain a logical 0. Thus, the signal which appears at the output of AND gate 99 in response to Q1-Q4 of shift register 94 containing the starting code will be passed through OR gate 145, be differentiated by capacitor C42 and resistor R53, and applied to line 120 as the sync signal. The circuitry of FIG. 11 will detect valid data and transmit it along with the signal to peripheral equipment as already shown. If the interrogator receiver receives valid inverted data according to coding scheme B, then the inputs to AND gate 99 can never be all logical 1's and the output of AND gate 99 will remain a logical 0. However, when the inverted starting code appears on the Q1-Q4 outputs of shift register 94, the inputs to AND gate 143 will be all logical 1's, thus causing the output of AND gate 143 to go HI. The HI signal at the output of AND gate 143 will therefore pass through OR gate 145, be differentiated by capacitor C42 and resistor R53, and be applied to line 120 as the sync signal. After the occurrence of the sync signal on line 120, the circuitry will examine subsequent pairs of bits to determine whether these pairs are logical compliments. Note that these subsequent pairs of bits will be logical compliments even for valid inverted data words according to coding scheme B. Thus, the circuitry of FIG. 11 as modified by FIG. 13 will reach the same conclusion regarding the validity of the received data, whether the data is inverted or not.

When the circuitry in FIG. 13 determines that a valid inverted data word according to coding scheme B has been received, the signal on line 115 will go HI and the signal generated at the output of AND gate 143, corresponding to detection of the inverted starting code, will pass through AND gate 144 to the output of AND gate 144 labelled INVERTED DATA. The INVERTED DATA signal will be transmitted to the peripheral equipment along with the SYNC OUT and DATA OUT signals, to indicate that the data is inverted and that the transponder associated with the data word contains a battery which requires replacement.

Figure 14:
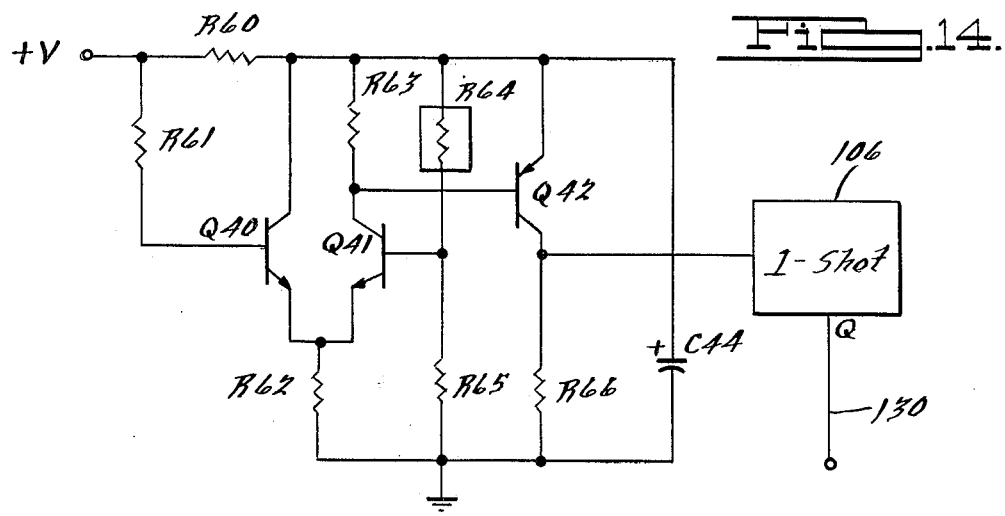
FIG. 14 illustrates another alternative embodiment of the transponder design of FIG. 8 which permits remote detection by the interrogator receiver of a weak transponder battery.

Alternatively, the relative condition of an alkaline battery can also be determined in accordance with the percentage drop in battery output voltage from a non-loaded condition to a loaded condition, where the load current is known. A modification to the transponder circuitry of FIG. 12 for causing the transponder to transmit its data word inverted when the percentage drop in battery output voltage from a non-loaded to a loaded condition exceeds a predetermined value is shown in FIG. 14. Note that the circuitry in FIG. 14 is intended to replace the circuitry in FIG. 12 enclosed by the dashed line labelled 135. In addition, inverter 131 is no longer needed in this embodiment.

Capacitor C44 in FIG. 14 is sufficiently large and the current through resistor R66 is sufficiently small so that the voltage across capacitor C44 can only change slowly (approximately 0.1 volts/second) in response to a substantial change in battery voltage +v. Resistors R64 and R65 comprise a voltage divider which holds the base of transistor Q41 at a fixed fraction of the unloaded battery voltage; for example, 75 percent. The base of transistor Q40, on the other hand, is at the instantaneous battery voltage. Transistors Q40 and Q41 and resistors R62 and R63 comprise a differential comparator. When the transponder is not activated, +v represents the unloaded battery voltage and the base voltage of transistor Q40 is clearly higher than the base voltage of transistor Q41. Thus, transistors Q41 and Q42 are turned off. However, when the transponder is activated, the battery voltage drops due to loading. If it drops below the voltage on the base of transistor Q41, then both transistors Q41 and Q42 are turned on and one-shot multivibrator 106 is fired. The Q output of one-shot 106 on line 130, which is normally LO, goes HI upon firing causing the data emanating from the transponder to be inverted, as before. Note that resistor R64 can alternatively be a device, such as a thermistor, whose resistance changes as a function of temperature to take into account the change in battery performance resulting from a change in ambient temperature.

While the above description constitutes the preferred embodiments of the present invention, it will be appreciated that the invention is susceptible to modification, variation and change without departing from the proper scope or fair meaning of the accompanying claims.

What is claimed is:

1. An object indentification system comprising:
 a transponder associated with the object to be identified including switching means responsive to a remote activation signal for producing a switching signal, memory means containing a coded data word identifying said object, and data transmission means responsive to said switching signal for optically transmitting a transponder signal representative of said coded data word at a frequency independent of the frequency of said switching signal, said data transmission means beginning transmission of said coded data word from a random point in said memory means; and
 an interrogator for identifying said object including remote activation means for generating said remote activation signal, receiver means for receiving said transponder signal, and processing means for determining the identity of said object from said received transponder signal including decoding means for determining the start of said coded data word and decoding said word.

2. The object identification system of claim 1 wherein said remote activation signal is an optical activation signal and said transponder switching means is adapted to respond to said optical activation signal.

3. In a vehicle identification system comprising a transponder located within the vehicle so as to permit optical communication with an interrogator through the windshield of the vehicle and including a self-contained portable power source, switching means responsive to a remote optical activation signal, memory means containing data identifying the vehicle, and data transmission means responsive to said switching means for optically transmitting a transponder signal representative of said data; and an interrogator for receiving said transponder signal and determining therefrom the identity of the vehicle; the improvement wherein:
 said interrogator further includes activation means comprising a flashtube for producing an abrupt, high magnitude, optical activation signal, which is positioned so as to transmit said optical activation signal through the windshield of the vehicle as said vehicle proceeds along a predetermined path; and
 said transponder switching means is tuned to respond only to intense, abrupt optical signals so that said transponder is not falsely activated by modulated sunlight.

4. The vehicle identification system of claim 3 wherein said transponder switching means includes optical transducer means for receiving light signals and producing a corresponding electrical signal proportional to the intensity of the light signal received and inductor means connected across said optical transducer means for filtering out d.c. and relatively low frequency signals produced by said optical transducer means.

5. The vehicle identification system of claim 4 wherein:
 said transponder further includes detection means for detecting when the powder in said portable power source is substantially depleted and first circuit means responsive to said detection means for causing said transmission means to alter said transponder signal; and
 said interrogator further includes second circuit means for detecting an altered transponder signal.

6. The remote identification system of claim 5 wherein said altered transponder signal is still representative of said data such that said interrogator can determine therefrom the identify of the vehicle.

7. The remote identification system of claim 6 wherein said data is in the form of a binary code and said first circuit means is adapted to cause said transmission means to invert the transmission of said binary code.

8. An object identification system comprising:
 a transponder associated with the object and containing a binary code identifying the object and including first circuit means for producing a first clock signal having a predetermined clock frequency an optical transmission means responsive to said clock signal for optically transmitting at said clock frequency said binary code by producing an optical pulse for each binary "1" in said code and no optical pulse for each binary "0" in said code; and
 an interrogator for determining the indentity of the object including receiver means for receiving the optical signal from said transponder and processing means for identifying said binary code comprising second circuit means for producing a second clock signal having a frequency substantially equivalent to said predetermined clock frequency and synchronizing means for synchronizing said circuit means with said first circuit means each time an optical pulse representing a binary "1" is received by said interrogator receiver means.

9. The object identification system of claim 8 wherein said transponder optical transmission means begins transmission of said binary code at a random point in said code.

10. The object identification system of claim 8 wherein said transponder further includes switching means for activating said first circuit means in response to a remote optical activation signal, and said interrogator further includes means for generating said optical activation signal.

* * * * *

UNITED STATES PATENT AND TRADEMARK OFFICE
CERTIFICATE OF CORRECTION

PATENT NO. : 4,325,146
DATED : April 13, 1982
INVENTOR(S) : John W. Lennington

It is certified that error appears in the above—identified patent and that said Letters Patent is hereby corrected as shown below:

Column 1, line 30, after "of" insert --the--.
Column 1, line 59, "disadvanges" should be --disadvantage--.
Column 4, line 28, "swithing" should be --switching--.
Column 7, line 35, "perdetermined" should be --predetermined--.
Column 12, line 20, second occurrence of "and" should be --are--.
Column 13, line 12, "range" should be --rate--.
Column 18, line 5, "which" should be --within--.
Column 18, line 15 and 17, "-" should be -- .... --.
Column 19, line 21, "ratio" should be --state--.
Column 20, line 5, "by" should be --be--.
Column 21, line 7, second occurrence of "Q" should be --$\overline{Q}$--.
Column 21, line 55, "if" should be --is--.
Column 24, line 27, after "the" insert --sync--.
Column 26, line 27, Claim 5, "4" should be --3--.
Column 26, line 30, Claim 5, "powder" should be --power--.
Column 26, line 63, Claim 8, before "circuit" insert --second--.

Signed and Sealed this

Fifth Day of October 1982

[SEAL]

Attest:

GERALD J. MOSSINGHOFF

Attesting Officer    Commissioner of Patents and Trademarks